(12) United States Patent
Choi et al.

(10) Patent No.: US 12,549,871 B2
(45) Date of Patent: Feb. 10, 2026

(54) PIXEL ARRAY WITH STRUCTURE FOR NOISE REDUCTION AND IMAGE SENSOR INCLUDING THE SAME

(71) Applicant: SAMSUNG ELECTRONICS CO., LTD., Suwon-si (KR)

(72) Inventors: Wonchul Choi, Suwon-si (KR); Hyeongdong Jo, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 71 days.

(21) Appl. No.: 18/733,372

(22) Filed: Jun. 4, 2024

(65) Prior Publication Data

US 2025/0024177 A1  Jan. 16, 2025

(30) Foreign Application Priority Data

Jul. 13, 2023 (KR) .......................... 10-2023-0091092

(51) Int. Cl.

| | |
|---|---|
| *H04N 25/59* | (2023.01) |
| *H04N 25/46* | (2023.01) |
| *H04N 25/767* | (2023.01) |
| *H04N 25/771* | (2023.01) |
| *H04N 25/778* | (2023.01) |
| *H04N 25/78* | (2023.01) |
| *H04N 25/13* | (2023.01) |

(52) U.S. Cl.
CPC ............. *H04N 25/59* (2023.01); *H04N 25/46* (2023.01); *H04N 25/767* (2023.01); *H04N 25/771* (2023.01); *H04N 25/778* (2023.01); *H04N 25/78* (2023.01); *H04N 25/134* (2023.01)

(58) Field of Classification Search
CPC ...... H04N 25/134; H04N 25/46; H04N 25/59; H04N 25/767; H04N 25/771; H04N 25/778; H04N 25/78
See application file for complete search history.

(56) References Cited

U.S. PATENT DOCUMENTS

| | | |
|---|---|---|
| 7,898,588 B2 | 3/2011 | McKee |
| 8,723,093 B2 | 5/2014 | Krymski |
| 9,407,847 B2 | 8/2016 | Maehashi et al. |

(Continued)

FOREIGN PATENT DOCUMENTS

| | | |
|---|---|---|
| KR | 10-0937320 B1 | 1/2010 |
| KR | 10-2020-0095829 A | 8/2020 |

(Continued)

*Primary Examiner* — Daniel M Pasiewicz
(74) *Attorney, Agent, or Firm* — Sughrue Mion, PLLC

(57) ABSTRACT

A pixel array includes: a plurality of unit pixel groups; and one or more columns including four column lines, wherein each unit pixel group of the plurality of unit pixel groups includes a first pixel group and a second pixel group, wherein the each unit pixel group includes a signal line including a drive transistor and a select transistor, wherein two unit pixel groups share a floating diffusion region, and wherein signal lines of the two unit pixel groups are connected to one column line, wherein each of the two unit pixel groups is configured to transfer a pixel signal to the one column line through the signal lines, wherein the floating diffusion region is located between a reset transistor and a dual conversion transistor, and wherein the dual conversion transistor is connected to the reset transistor and the drive transistor.

20 Claims, 18 Drawing Sheets

(56) References Cited

U.S. PATENT DOCUMENTS

| | | | |
|---|---|---|---|
| 10,397,503 B2 | 8/2019 | Malinge et al. | |
| 10,645,312 B2 | 5/2020 | Kobayashi | |
| 10,879,286 B2 | 12/2020 | Im et al. | |
| 11,516,424 B2 | 11/2022 | Hwang et al. | |
| 11,533,446 B2 | 12/2022 | Ha | |
| 11,588,989 B2 | 2/2023 | Mun | |
| 11,689,827 B2 * | 6/2023 | Jung et al. | |
| 2014/0319322 A1 * | 10/2014 | Mandier | H10F 39/813 250/208.1 |
| 2019/0386057 A1 * | 12/2019 | Wang | H10F 39/803 |
| 2021/0082987 A1 | 3/2021 | Kawai et al. | |
| 2021/0136303 A1 * | 5/2021 | Kim | H04N 25/704 |
| 2021/0296382 A1 | 9/2021 | Ono | |
| 2022/0006967 A1 * | 1/2022 | Asakura | H04N 25/771 |
| 2022/0264051 A1 * | 8/2022 | Etou | H03M 1/1225 |
| 2022/0321816 A1 | 10/2022 | Ochiai et al. | |
| 2022/0321822 A1 * | 10/2022 | Yang | H10F 39/802 |
| 2022/0360731 A1 * | 11/2022 | Kim | H04N 25/771 |
| 2022/0408038 A1 | 12/2022 | Kim et al. | |
| 2023/0144373 A1 * | 5/2023 | Kim | H10F 39/8053 348/302 |
| 2024/0187755 A1 * | 6/2024 | Talbot | H04N 25/767 |
| 2024/0334088 A1 * | 10/2024 | Han | H04N 25/778 |

FOREIGN PATENT DOCUMENTS

| | | |
|---|---|---|
| KR | 10-2021-0114290 A | 9/2021 |
| KR | 10-2021-0156458 A | 12/2021 |
| KR | 10-2022-0103282 A | 7/2022 |
| KR | 10-2022-0169592 A | 12/2022 |

* cited by examiner

PIXEL ARRAY WITH STRUCTURE FOR NOISE REDUCTION AND IMAGE SENSOR INCLUDING THE SAME

CROSS-REFERENCE TO RELATED APPLICATIONS

This application is based on and claims priority under 35 U.S.C. § 119 to Korean Patent Application No. 10-2023-0091092, filed on Jul. 13, 2023, in the Korean Intellectual Property Office, the disclosure of which is incorporated by reference herein in its entirety.

BACKGROUND

1. Field

The disclosure relates to a pixel array and an image sensor including the pixel array, and more particularly, to a pixel array to which a structure for noise reduction is applied and an image sensor including the pixel array.

2. Description of Related Art

An image sensor may include a charge coupled device (CCD) image sensor, a complementary metal-oxide semiconductor (CMOS) image sensor (CIS), etc. The CMOS image sensor may include pixels which include CMOS transistors and which convert light energy into an electrical signal using a photoelectric conversion element included in each pixel. The CMOS image sensor may obtain information about a captured/photographed image by using the electrical signal generated by each pixel.

To reduce a noise included in an output image, a pixel signal may be output using drive transistors and select transistors of neighboring pixels sharing a floating diffusion region. However, when the pixels sharing the floating diffusion region are connected to different output lines, it may be impossible to use the above technique.

SUMMARY

Provided is a pixel array to which a structure for noise reduction is applied, and an image sensor including the pixel array.

Additional aspects will be set forth in part in the description which follows and, in part, will be apparent from the description, or may be learned by practice of the presented embodiments.

In accordance with an aspect of the disclosure, a pixel array includes a plurality of unit pixel groups; and one or more columns, wherein each column of the one or more columns includes four column lines, wherein each unit pixel group of the plurality of unit pixel groups includes a first pixel group and a second pixel group, and wherein each of the first pixel group and the second pixel group includes a plurality of pixels, wherein the first pixel group and the second pixel group are arranged in a column direction, wherein the each unit pixel group includes a signal line including a drive transistor and a select transistor, wherein two unit pixel groups from among the plurality of unit pixel groups share a floating diffusion region, and wherein signal lines of the two unit pixel groups are connected to one column line from among the four column lines, wherein each of the two unit pixel groups is configured to transfer a pixel signal to the one column line through the signal lines in a readout operation, wherein the floating diffusion region is located between a reset transistor and a dual conversion transistor included in the each unit pixel group of the plurality of unit pixel groups, wherein the reset transistor is connected to a power supply voltage terminal, and wherein the dual conversion transistor is connected to the reset transistor and the drive transistor.

In accordance with an aspect of the disclosure, a pixel array includes a plurality of unit pixel groups; and one or more columns, wherein each column of the one or more columns includes four column lines, wherein each unit pixel group of the plurality of unit pixel groups includes: a first pixel group located at a first row and including a plurality of first color pixels; a second pixel group located at a second row and including a plurality of second color pixels; a first floating diffusion region connected to transfer transistors of the first pixel group and the second pixel group; a drive transistor configured to generate a pixel signal; a select transistor connected to one of the four column lines; a reset transistor connected to a power supply voltage terminal; a dual conversion transistor connected to the reset transistor and the drive transistor; and a second floating diffusion region connected to the dual conversion transistor and the reset transistor, wherein the drive transistor and the select transistor are included in a signal line, wherein two neighboring unit pixel groups among the plurality of unit pixel groups share the second floating diffusion region and are connected to one column line from among the four column lines, and wherein each of the two neighboring unit pixel groups is configured to transfer the pixel signal to the one column line through signal lines of the two neighboring unit pixel groups.

In accordance with an aspect of the disclosure, an image sensor includes a pixel array including one or more columns and configured to output a plurality of pixel signals from a plurality of unit pixel groups, wherein each column of the one or more columns includes four column lines; a row driver configured to control each row of the pixel array; a multiplexer configured to perform analog binning with respect to the plurality of pixel signals; and an analog-to-digital conversion (ADC) circuit configured to convert a signal output from the multiplexer into a digital signal, wherein each unit pixel group of the plurality of unit pixel groups includes a first pixel group and a second pixel group, and wherein each of the first pixel group and the second pixel group includes a plurality of pixels, wherein the first pixel group and the second pixel group are arranged in a column direction, wherein the each unit pixel group includes a signal line including a drive transistor and a select transistor, wherein signal lines of two unit pixel groups which share a floating diffusion region from among the plurality of unit pixel groups are connected to one column line from among the four column lines, wherein the two unit pixel groups are configured to transfer a pixel signal to the one column line through the signal lines in a readout operation, wherein the floating diffusion region is located between a reset transistor and a dual conversion transistor included in the each unit pixel group, wherein the reset transistor is connected to a power supply voltage terminal, and wherein the dual conversion transistor is connected to the reset transistor and the drive transistor.

BRIEF DESCRIPTION OF THE FIGURES

The above and other aspects, features, and advantages of certain embodiments of the present disclosure will be more apparent the following description taken in conjunction with the accompanying drawings, in which.

DETAILED DESCRIPTION

Below, embodiments of the present disclosure will be described in detail and clearly to such an extent that an ordinary one in the art easily carries out the present disclosure.

In the detailed description, components described with reference to the terms "part", "unit", "module", "block", "-er" or "-or", etc., and function blocks illustrated in drawings may be implemented using software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
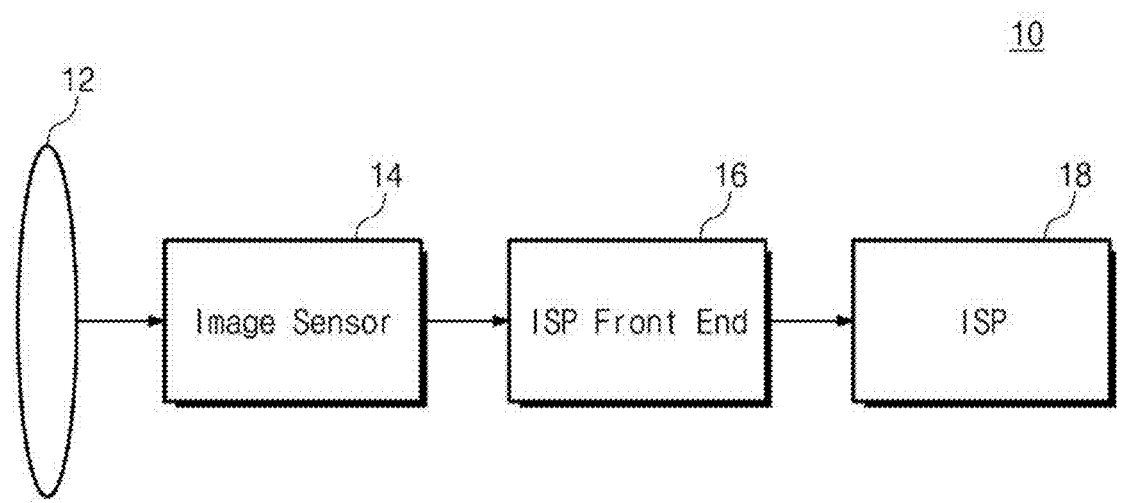
FIG. 1 illustrates an example of a configuration of an image processing system, according to an embodiment.

FIG. 1 illustrates an example of a configuration of an image processing system 10 according to an embodiment of the present disclosure. The image processing system 10 may be included in various electronic devices such as a smartphone, a digital camera, a laptop computer, and a desktop computer.

Referring to FIG. 1, the image processing system 10 may include a lens 12, an image sensor 14, an image signal processor (ISP) front end 16, and an ISP 18.

Light may be reflected by an object, a scenery, etc., targeted for photographing, and the lens 12 may receive the reflected light. The image sensor 14 may generate an electrical signal based on the light received through the lens 12. For example, the image sensor 14 may include a complementary metal oxide semiconductor (CMOS) image sensor. For example, the image sensor 14 may be a multi-pixel image sensor having a dual pixel structure or a tetracell structure.

The image sensor 14 may include a pixel array. Pixels of the pixel array may convert light into electrical signals and may generate pixel values. A ratio at which light is converted into an electrical signal (e.g., a voltage) may referred to as a conversion gain. In particular, the pixel array may generate pixel signals under a low conversion gain condition and a high conversion gain condition, by using a dual conversion gain in which a conversion gain changes.

In addition, the image sensor 14 may include an analog-to-digital conversion (ADC) circuit for performing a correlated double sampling (CDS) operation on the pixel values. An example configuration of the image sensor 14 is described in detail below with reference to FIG. 2.

The ISP front end 16 may perform pre-processing with respect to the electrical signals output from the image sensor 14 so that they are appropriate for processing by the ISP 18.

The ISP 18 may generate image data associated with the photographed object, scenery, etc. by appropriately processing the electrical signals processed by the ISP front end 16. To this end, the ISP 18 may perform various processing such as color correction, auto white balance, gamma correction, color saturation correction, bad pixel correction, and hue correction.

FIG. 1 shows an example in which the image processing system 10 includes one lens 12 and one image sensor 14. However, in another embodiment, the image processing system 10 may include a plurality of lenses, a plurality of image sensors, and a plurality of ISP front ends. In this case, the plurality of lenses may have different fields of view. Also, the plurality of image sensors may have different functions, different performances, and/or different characteristics and may include pixel arrays of different configurations.

Figure 2:
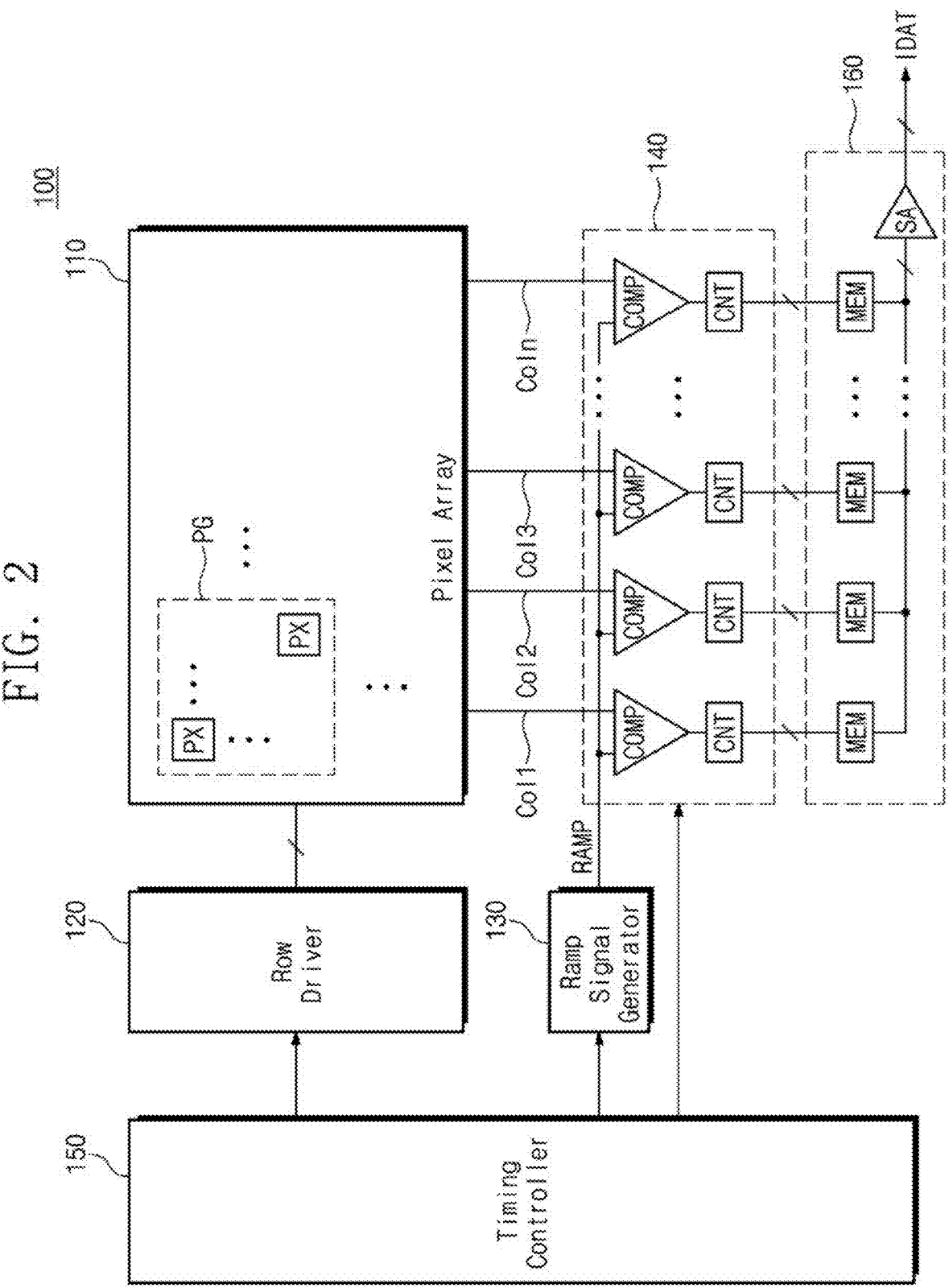
FIG. 2 illustrates an example of a configuration of an image sensor of FIG. 1, according to an embodiment.

FIG. 2 illustrates an example of a configuration of the image sensor 14 of FIG. 1. Referring to FIG. 2, an image sensor 100 may include a pixel array 110, a row driver 120, a ramp signal generator 130, an ADC circuit 140, a timing controller 150, and a buffer 160.

The pixel array 110 may include a plurality of pixels PX arranged as a matrix, for example, arranged along rows and columns. Each of the plurality of pixels may include a photoelectric conversion element. For example, the photoelectric conversion element may include at least one of a photodiode, a photo transistor, a photo gate, and a pinned photodiode.

Figure 3:
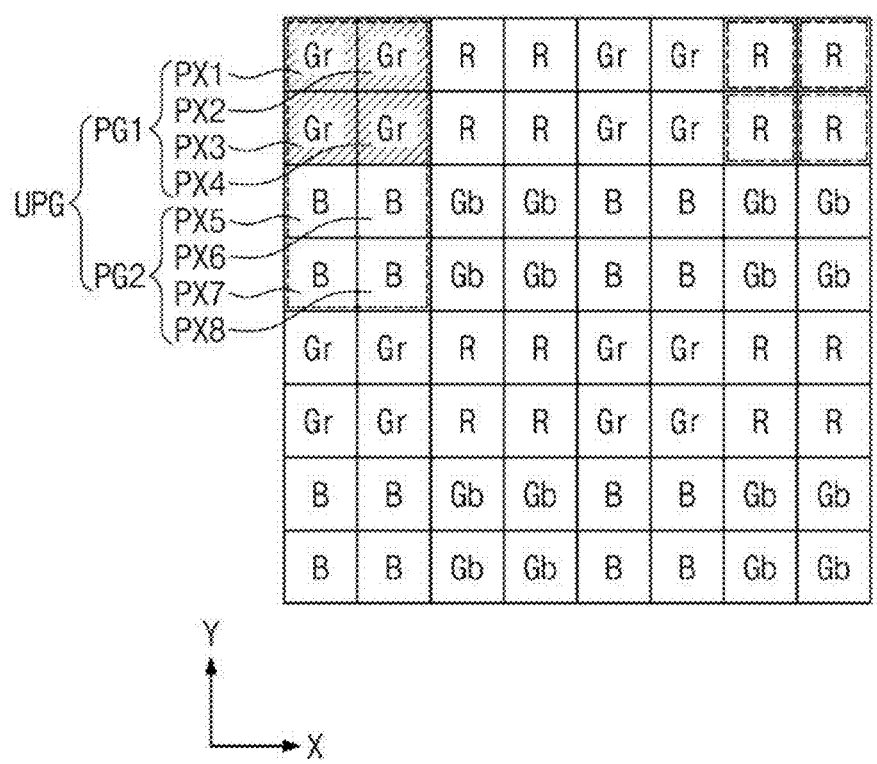
FIG. 3 illustrates an example of a configuration of a pixel array of FIG. 2, according to an embodiment.

The plurality of pixels PX included in the pixel array 110 may include a plurality of pixel groups PG. Each of the pixel groups PG may include two or more pixels. The plurality of pixels PX included in the pixel groups PG may share one floating diffusion region or a plurality of floating diffusion regions. An example in which the pixel array 110 illustrated in FIG. 2 includes the pixel groups PG arranged as a matrix with four rows and four columns (e.g., includes 4×4 pixel groups PG) is illustrated in FIG. 3. However, embodiments are not limited thereto.

The pixel group PG may include pixels corresponding to the same color. For example, the pixel group PG may include a red pixel to convert light having a red spectrum into an electrical signal, a green pixel to convert light having a green spectrum into an electrical signal, or a blue pixel to convert light having a blue spectrum into an electrical signal. For example, the pixels PX included in the pixel array 110 may be arranged in the form of a Tetra-Bayer pattern. Also, a micro lens and a color filter may be stacked on/over each pixel. With regard to the light incident through the micro lens, the color filter may transmit light of a specific color, for example light having a wavelength in a specific color zone, and a color that the pixel is capable of detecting may be determined based on the color filter provided in the pixel.

The pixels PX of the pixel array 110 may output pixel signals to the ADC circuit 140 through column lines of columns Col1 to Coln, depending on the intensity or the amount of light incident from the outside. For example, the pixel signal may be an analog signal corresponding to the intensity or the amount of light incident from the outside.

Also, each of the columns Col1 to Coln of the pixel array 110 of the present disclosure may include four column lines. For example, in the pixel array 110, some pixels disposed at one column may be connected to a first column line, others thereof may be connected to a second column line, others thereof may be connected to a third column line, and the others thereof may be connected to a fourth column line.

In the readout operation, the pixel array 110 may perform analog binning with respect to pixel signals in order to output them to the ADC circuit 140. In some embodiments, the image sensor 100 may include multiplexers performing the analog binning. In this case, for the minimization of an H-time (which may refer to a readout time), the pixel array 110 may use a two-row simultaneously-read (2RSR) technique for simultaneously performing the readout operations on two rows during one H-time and may sum (or average) pixel values (or pixel signals) of pixels through the analog binning together with the 2RSR technique.

The pixels PX of the pixel array 110 may be classified into active pixels and dummy pixels. The pixels PX of the pixel groups PG illustrated in FIG. 2 may be the active pixels, and the dummy pixels may be located at the border of the pixel array 110, for example, to be adjacent to the boundary of the active pixels. The active pixels may receive the light reflected from an object and may convert the received light into electrical signals, and the dummy pixels may be shielded from an external light and may generate dark currents depending on a given factor (e.g., a temperature) regardless of the presence of light.

The row driver 120 may select and drive a row of the pixel array 110. The row driver 120 may decode an address and/or a control signal generated by the timing controller 150 and may generate control signals for selecting and driving a row of the pixel array 110. For example, the control signals may include a signal for selecting a pixel, a signal for resetting a floating diffusion region, etc. In particular, the pixel array 110 according to an embodiment of the present disclosure may simultaneously read out pixels located at two rows, and the row driver 120 may select and drive two rows to be read out simultaneously.

The ramp signal generator 130 may generate a ramp signal RAMP under control of the timing controller 150. For example, the ramp signal generator 130 may operate in response to a control signal such as a ramp enable signal. When the ramp enable signal is activated, the ramp signal generator 130 may generate the ramp signal RAMP based on preset values (e.g., a start level, an end level, and a slope). For example, the ramp signal RAMP may be a signal that increases or decreases along a preset slope during a specific time. The ramp signal RAMP may be provided to the ADC circuit 140.

The ADC circuit 140 may receive pixel signals from the plurality of pixels PX of the pixel array 110 through column lines and may receive the ramp signal RAMP from the ramp signal generator 130. The ADC circuit 140 may operate based on a correlated double sampling (CDS) technique for extracting a difference between the reset signal and the image signal obtained from the received pixel signal as an effective signal component. The ADC circuit 140 may include a plurality of comparators COMP and a plurality of counters CNT.

In detail, each of the comparators COMP may perform correlated double sampling (CDS) by comparing the reset signal of the pixel signal and the ramp signal RAMP and comparing the image signal of the pixel signal and the ramp signal RAMP. Each of the counters CNT may count pulses of the signal experiencing the correlated double sampling and may output a counting result as a digital signal.

The timing controller 150 may generate a control signal and/or a clock for controlling an operation and/or a timing of each of the row driver 120, the ramp signal generator 130, and the ADC circuit 140.

The buffer 160 may include memories MEMs and a sense amplifier SA. The memories MEM may store digital signals output from the corresponding counters CNT of the ADC circuit 140. The sense amplifier SA may sense and amplify the digital signals stored in the memories MEMs. The sense amplifier SA may output the amplified digital signals as image data IDAT, and the image data IDAT may be provided to the ISP front end 16 of FIG. 1.

In some embodiments, the image sensor 100 may operate in a full mode. When operating in the full mode, the image sensor 100 may perform correlated double sampling (CDS) with respect to the pixel values generated from all the active pixels of the image sensor 100 and may count pulses of the signal experiencing the correlated double sampling in order to output them as a digital signal.

In some embodiments, the image sensor 100 may operate in a binning mode. When operating in the binning mode, the image sensor 100 may output a value (or an average value), which is obtained by summing the pixel values generated from pixels having the same type from among all the active pixels of the pixel array 110, as a pixel signal.

FIG. 3 illustrates an example of a configuration of the pixel array 110 of FIG. 2. Referring to FIG. 3, the plurality of pixel groups PG of a pixel array 210 may include a first plurality of green pixels Gr, a second plurality of green pixels Gb, a plurality of blue pixels B, and a plurality of red pixels R. For example, two green pixels Gr and Gb, one blue pixel B, and one red pixel R may be disposed in the form of a 2×2 matrix, and two green pixels Gr and Gb may be disposed in a diagonal direction. The above pixel pattern (which may correspond to the Tetra-Bayer pattern) may be repeatedly disposed in the pixel array 110.

Each of the plurality of pixel groups PG of the pixel array 210 may include first to fourth pixels PX1 to PX4 of the same color. The first pixel PX1 may be disposed at a top left position of the pixel group PG, the second pixel PX2 may be disposed oat a top right position of the pixel group PG, the third pixel PX3 may be disposed at a bottom left position of the pixel group PG, and the fourth pixel PX4 may be disposed at a bottom right position of the pixel group PG. Accordingly, the first pixel PX1 and the second pixel PX2 may be disposed side by side in an X-axis direction, the third pixel PX3 and the fourth pixel PX4 may be disposed side by side in the X-axis direction, the first pixel PX1 and the third pixel PX3 may be disposed side by side in a Y-axis direction, and the second pixel PX2 and the fourth pixel PX4 may be disposed side by side in the Y-axis direction.

In addition, the pixel array 110 may be divided into a plurality of unit pixel groups UPG. The unit pixel group UPG may include two pixel groups PG disposed adjacent to each other in the Y-axis direction. For example, the unit pixel group UPG may include the pixel groups PG including the green pixels Gr and the blue pixels B or may include the pixel groups PG including the red pixels R and the green pixels Gb. The pixel groups PG included in the unit pixel group UPG may share a first floating diffusion region (e.g., a first floating diffusion region FD1 of FIG. 4), and the unit pixel groups UPG adjacent to each other in the Y-axis direction (e.g., a first unit pixel group UPG1 and a second unit pixel group UPG2 of FIG. 5) may share a second floating diffusion region (e.g., a second floating diffusion region FD2 of FIG. 4 or 5). The unit pixel group UPG may be a pixel unit for performing the readout operation according to an embodiment of the present disclosure, and an example of the readout operation is described in detail below with reference to FIGS. 6 and 7.

Figure 4:
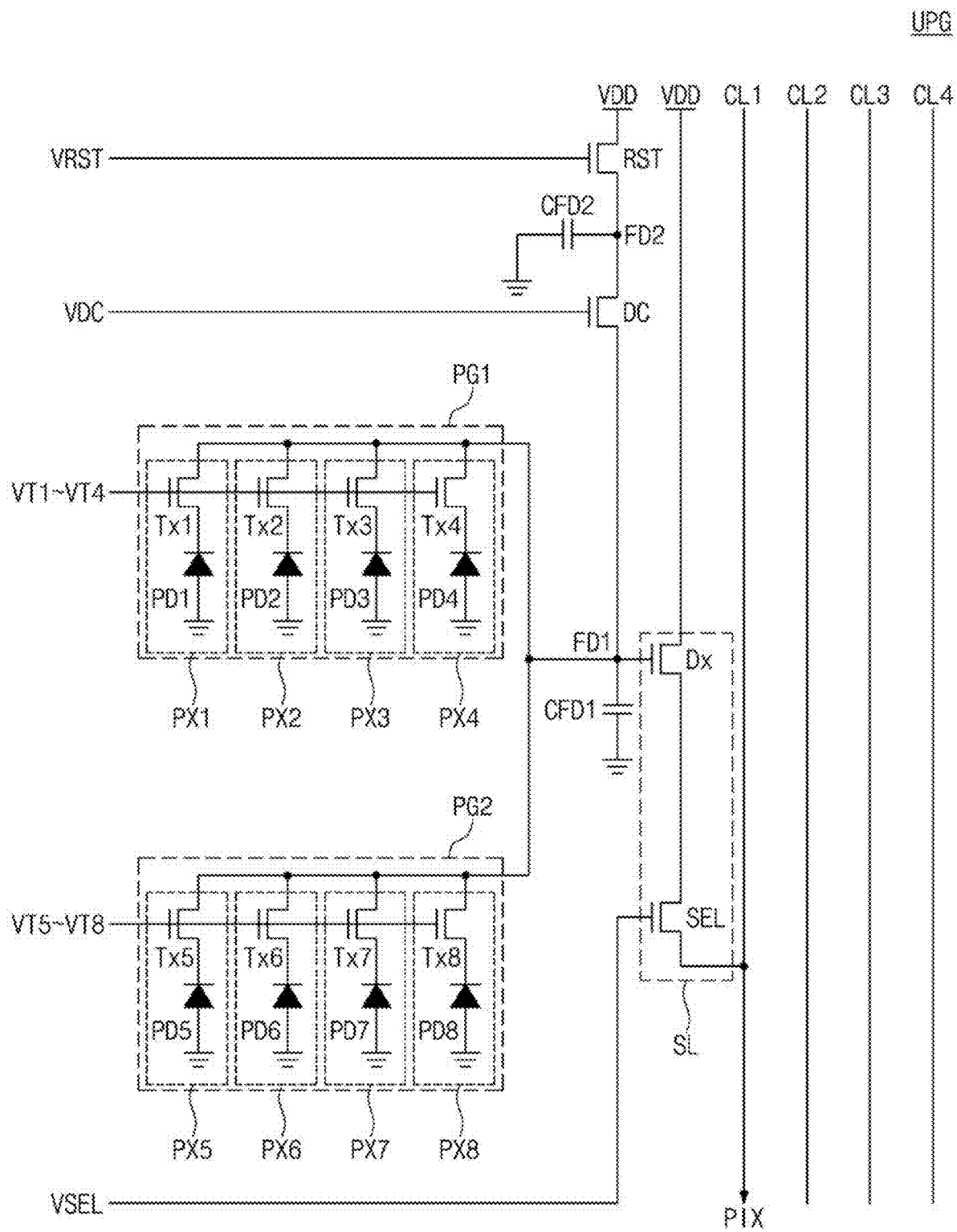
FIG. 4 is a circuit diagram illustrating a unit pixel group of FIG. 3, according to an embodiment.

FIG. 4 is a circuit diagram illustrating the unit pixel group UPG of FIG. 3. Referring to FIG. 4, the unit pixel group UPG may include a first pixel group PG1 including pixels PX1 to PX4, a second pixel group PG2 including pixels PX5 to PX8, a reset transistor RST, a dual conversion transistor DC, a drive transistor Dx, and a select transistor SEL. For example, the first pixel group PG1 may include a plurality of green pixels Gr, and the second pixel group PG2 may include a plurality of blue pixels B. In some embodiments, the first pixel group PG1 may include a plurality of red pixels R, and the second pixel group PG2 may include a plurality of green pixels Gb.

In the pixel groups PG1 and PG2, the first pixel PX1 may include a first photoelectric conversion element PD1 and a first transfer transistor Tx1, and each of the remaining pixels PX2 to PX8 may also include similar components/elements. The pixel groups PG1 and PG2 may share the reset transistor RST, the dual conversion transistor DC, the drive transistor Dx, and the select transistor SEL. Also, the pixel groups PG1 and PG2 may share the first floating diffusion region FD1.

The first floating diffusion region FD1 or the second floating diffusion region FD2 may accumulate (or integrate) charges corresponding to the amount of incident light. While the transfer transistors Tx1 to Tx8 are respectively turned on by transfer signals VT1 and VT8, the first floating diffusion region FD1 or the second floating diffusion region FD2 may accumulate charges transferred from the photoelectric conversion elements PD1 to PD8. Because the first floating diffusion region FD1 is connected to a gate terminal of the drive transistor Dx operating as a source follower amplifier, a voltage corresponding to the amount of charges accumulated at the first floating diffusion region FD1 may be formed.

The capacitance of the first floating diffusion region FD1 may correspond to a first capacitance CFD1, and the capacitance of the second floating diffusion region FD2 may correspond to a second capacitance CFD2. In embodiments, each of the first capacitance CFD1 and the second capacitance CFD2 may refer to a parasitic capacitance.

The dual conversion transistor DC may be driven by a dual conversion signal VDC. In a normal environment, because the first floating diffusion region FD1 may not be easily saturated, there may be no need to increase the capacitance (e.g., CFD1) of the first floating diffusion region FD1. In this case, the dual conversion transistor DC may be turned off. The conversion gain corresponding to the case where the dual conversion transistor DC is turned off may be referred to as a high conversion gain.

However, in a high-illuminance environment, the first floating diffusion region FD1 may be easily saturated. To prevent the saturation, the dual conversion transistor DC may be turned on, and the first floating diffusion region FD1 may be electrically connected to the second floating diffusion region FD2. As such, the capacitance of the floating diffusion regions CFD1 and CFD2 may be increased to a sum of the first capacitance CFD1 and the second capacitance CFD2. The conversion gain corresponding to the case where the dual conversion transistor DC is turned on may be referred to as a low conversion gain.

The transfer transistors Tx1 to Tx8 may be respectively driven by the transfer signals VT1 to VT8 and may transfer the charges generated (or integrated) by the photoelectric conversion elements PD1 to PD8 to the first floating diffusion region FD1 or the second floating diffusion region FD2. For example, first ends of the transfer transistors Tx1 to Tx8 may be respectively connected to the photoelectric conversion elements PD1 to PD8, and second ends of the transfer transistors Tx1 to Tx8 may be connected in common to the first floating diffusion region FD1.

The reset transistor RST may be driven by a reset control signal VRST and may provide a power supply voltage VDD to the first floating diffusion region FD1 or the second floating diffusion region FD2. As such, the charges accumulated at the first floating diffusion region FD1 or the second floating diffusion region FD2 may move to a terminal for the power supply voltage VDD, and a voltage of the first floating diffusion region FD1 or the second floating diffusion region FD2 may be reset.

The drive transistor Dx may amplify the voltage of the first floating diffusion region FD1 or the second floating diffusion region FD2 to generate a pixel signal PIX.

The select transistor SEL may be driven by a selection signal VSEL and may select pixels to be read in units of a row. The select transistor SEL may be connected to one of four column lines CL1, CL2, CL3, and CL4. As an example, the select transistor SEL of the unit pixel group UPG illustrated in FIG. 4 may be connected to the first column line CL1, and unit pixel groups present at the same column as the unit pixel group UPG of FIG. 4 may be connected to the second column line CL2, the third column line CL3, or the fourth column line CL4.

The drive transistor Dx and the select transistor SEL may be included in a signal line SL. For example, the unit pixel group UPG may include the signal line SL in which the drive transistor Dx and the select transistor SEL are included. When the select transistor SEL is turned on, the pixel signal PIX generated by the drive transistor Dx may be transferred to the first column line CL1 through the signal line SL and may be output to the ADC circuit 140 of FIG. 2 through the first column line CL1.

Figure 5:
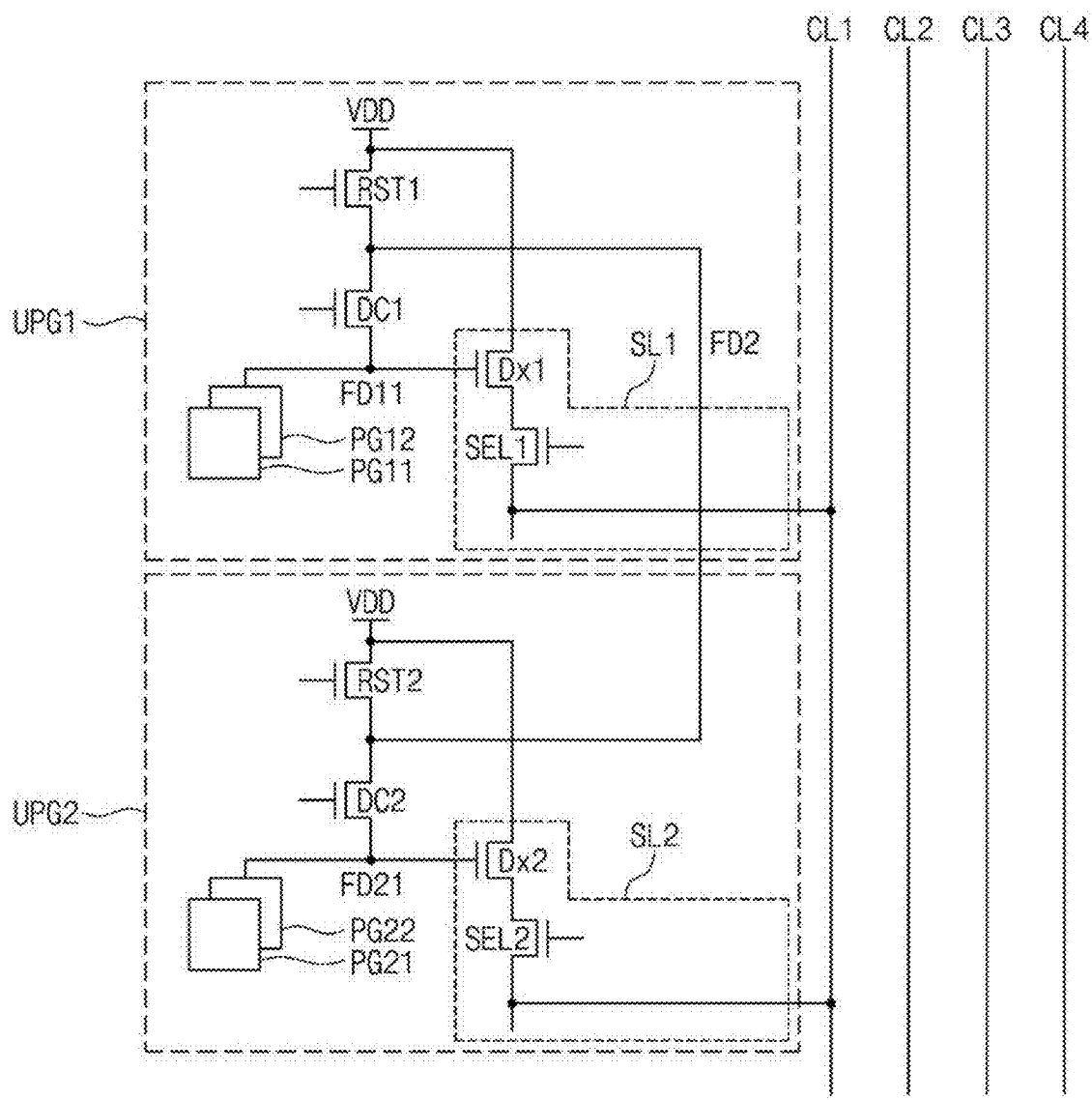
FIG. 5 is a circuit diagram illustrating two neighboring unit pixel groups of a pixel array of FIG. 2, which share a second floating diffusion region, according to an embodiment.

FIG. 5 is a circuit diagram illustrating two neighboring unit pixel groups UPG1 and UPG2 of the pixel array 110, which may share the second floating diffusion region FD2. Referring to FIG. 5, the first unit pixel group UPG1 may include pixel groups PG11 and PG12, and the second unit pixel group UPG2 may include pixel groups PG21 and PG22. The pixel groups PG11 and PG12 may share a first floating diffusion region FD11, the pixel groups PG21 and PG22 may share a first floating diffusion region FD21, the first unit pixel group UPG1 and the second unit pixel group UPG2 may share the second floating diffusion region FD2.

As described with reference to FIG. 4, charges that are generated from photoelectric conversion elements of pixels under the low conversion gain condition, in which dual conversion transistors DC1 and DC2 are turned on, may be transferred to the second floating diffusion region FD2. Also, an example in which both the first unit pixel group UPG1 and the second unit pixel group UPG2 are connected to the first column line CL1 is illustrated in FIG. 5, and other unit pixel groups not illustrated in FIG. 5 may be connected to the second column line CL2, the third column line CL3, or the fourth column line CL4. Operations of reset transistors RST1 and RST2, the dual conversion transistors DC1 and DC2, drive transistors Dx1 and Dx2, select transistors SEL1 and SEL2 and signals for controlling the transistors are the same as those described with reference to FIG. 4, and thus, additional description may be omitted to avoid redundancy.

Unit pixel groups sharing the second floating diffusion region FD2 may be connected to the same column line. For example, as illustrated in FIG. 5, the select transistor SEL1 of the first unit pixel group UPG1 and the second select transistor SEL2 of the second unit pixel group UPG2 may be connected to the first column line CL1.

Each unit pixel group sharing the second floating diffusion region FD2 may transfer a pixel signal through a signal line of the other unit pixel group sharing the second floating diffusion region FD2 in the readout operation. For example, based on the first unit pixel group UPG1 being read out, the pixel signal generated by the first drive transistor Dx1 may be transferred to the first column line CL1 through a first signal line SL1 of the first unit pixel group UPG1 and a second signal line SL2 of the second unit pixel group UPG2 (e.g., based on the first select transistor SEL1 and the second select transistor SEL2 being turned on).

As described above, when the pixel signal is transferred through signal lines of unit pixel groups sharing the second floating diffusion region FD2, the number of drive transistors each operating as a source follower amplifier may increase. In this case, the photo response non-uniformity (PRNU) may be minimized, and the variation between pixels may decrease. Also, a transconductance indicating a ratio of an output current change to an input voltage change may increase, and noise such as a random telegraph signal (RTS) and a random noise (RN) may decrease.

Figure 6:
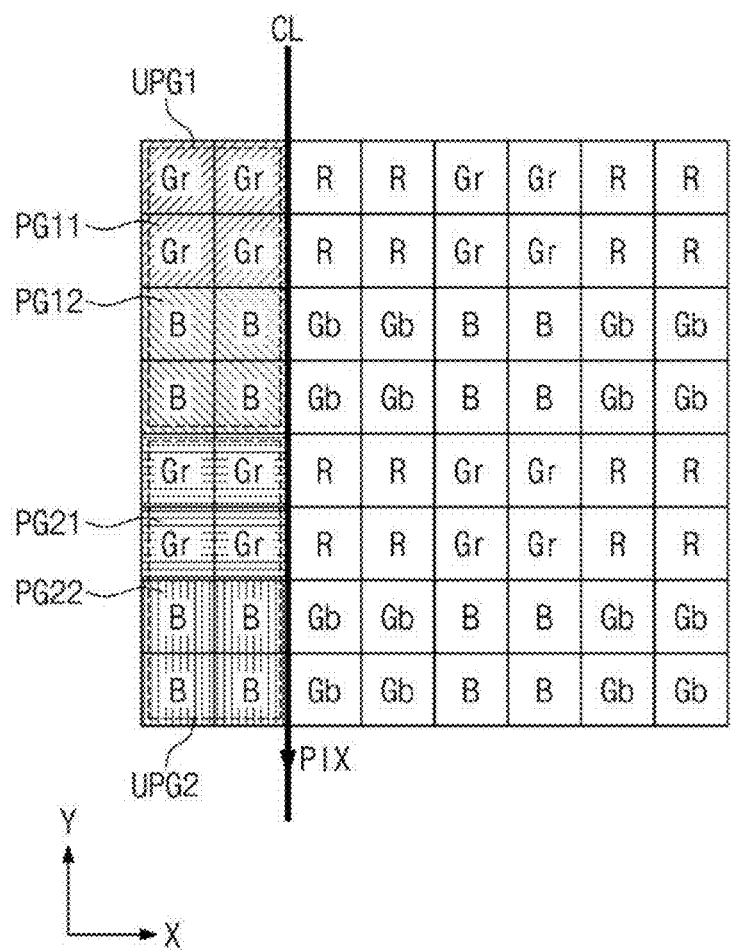
FIG. 6 illustrates an example of a readout operation of a pixel array FIG. 3, according to an embodiment.

FIG. 6 illustrates an example of a pixel readout operation of the pixel array 210 of FIG. 3. In FIG. 6, the first pixel PX1 may be disposed at the top left position of the pixel group, the second pixel PX2 may be disposed at the top right position of the pixel group, the third pixel PX3 may be disposed at the bottom left position of the pixel group, and the fourth pixel PX4 may be disposed at the bottom right position of the pixel group.

Referring to FIG. 6, the first unit pixel group UPG1 may include the pixel groups PG11 and PG12, and the second unit pixel group UPG2 may include the pixel groups PG21 and PG22. The first unit pixel group UPG1 and the second unit pixel group UPG2 may share the second floating diffusion region FD2 and may be connected to the same column line CL.

The pixel array 210 may operate in a first binning mode. The first binning mode may refer to a mode in which pixels of the same color of the unit pixel group are read out at the same time.

For example, during a first H-time, pixel values of the green pixels Gr of the first unit pixel group UPG1 (e.g., values of charges generated from photoelectric conversion elements of the green pixels Gr of the first unit pixel group UPG1) may be summed. For example, in the first pixel group PG11, the pixel value of the first pixel, the pixel value of the second pixel, the pixel value of the third pixel, and the pixel value of the fourth pixel may be summed. The summed value may be output as the pixel signal PIX.

For example, during the first H-time, pixel values of the blue pixels B of the first unit pixel group UPG1 (e.g., values of charges generated from photoelectric conversion elements of the blue pixels B of the first unit pixel group UPG1) may be summed. For example, in the second pixel group PG12, the pixel value of the first pixel, the pixel value of the second pixel, the pixel value of the third pixel, and the pixel value of the fourth pixel may be summed. The summed value may be output as the pixel signal PIX.

For example, during the first H-time, pixel values of the green pixels Gr of the second unit pixel group UPG2 (e.g., values of charges generated from photoelectric conversion elements of the green pixels Gr of the second unit pixel group UPG2) may be summed. For example, in the first pixel group PG21, the pixel value of the first pixel, the pixel value of the second pixel, the pixel value of the third pixel, and the pixel value of the fourth pixel may be summed. The summed value may be output as the pixel signal PIX.

For example, during the first H-time, pixel values of the blue pixels B of the second unit pixel group UPG2 (e.g., values of charges generated from photoelectric conversion elements of the blue pixels B of the second unit pixel group UPG2) may be summed. For example, in the second pixel group PG22, the pixel value of the first pixel, the pixel value of the second pixel, the pixel value of the third pixel, and the pixel value of the fourth pixel may be summed. The summed value may be output as the pixel signal PIX.

Even though the readout operations of the pixels of the first unit pixel group UPG1 and the second unit pixel group UPG2 are described with reference to FIG. 6, the same readout operations may also be performed with respect to pixels of unit pixel groups connected to any other column line of any other column.

Figure 7:
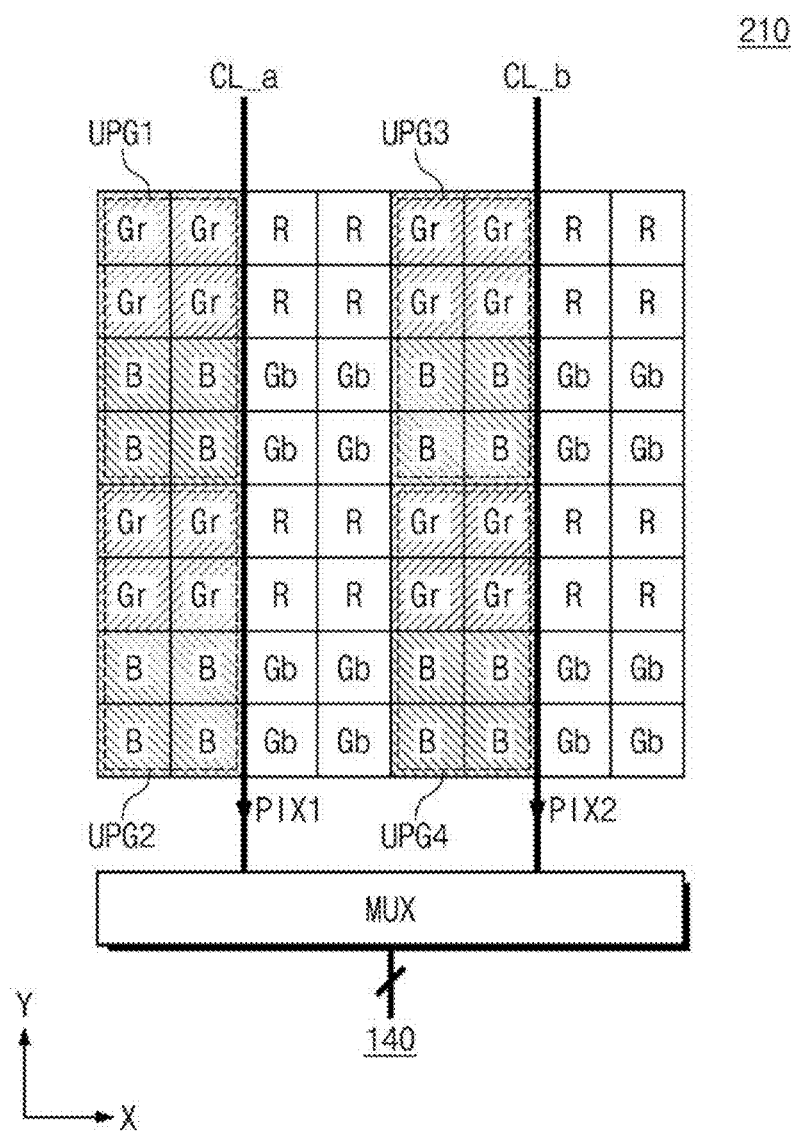
FIG. 7 illustrates an example of a readout operation of a pixel array FIG. 3, according to an embodiment.

FIG. 7 illustrates an example of a pixel readout operation of the pixel array 210 of FIG. 3. First to fourth unit pixel groups UPG1 to UPG4 are illustrated in FIG. 7. The first unit pixel group UPG1 and the second unit pixel group UPG2 share the second floating diffusion region FD2 and are connected to the same column line CL_a, and the third unit pixel group UPG3 and the fourth unit pixel group UPG4 share the second floating diffusion region FD2 and are connected to the same column line CL_b. In this case, the third unit pixel group UPG3 and the fourth unit pixel group UPG4 are connected to a column line of a column different from that of the first unit pixel group UPG1 and the second unit pixel group UPG2.

The pixel array 210 may operate in a second binning mode. The second binning mode may refer to a mode in which pixels of the same color located at a plurality of rows are simultaneously read out by using analog binning.

For example, during the first H-time, pixel values of the green pixels Gr of the first unit pixel group UPG1 (e.g., values of charges generated from photoelectric conversion elements of the green pixels Gr of the first unit pixel group UPG1) may be summed. At the same time, pixel values of the green pixels Gr of the second unit pixel group UPG2 connected to the same column line CL_a as the first unit pixel group UPG1 may be summed. A sum of the pixel values of the green pixels Gr of the first unit pixel group UPG1 and the second unit pixel group UPG2 may be output as a first pixel signal PIX1.

Also, at the same time, a sum of the pixel values of the green pixels Gr of the third unit pixel group UPG3 and the fourth unit pixel group UPG4 that are respectively located at the same row as the first unit pixel group UPG1 and at the same row as the second unit pixel group UPG2 and are connected to the same column line CL_b may be output as a second pixel signal PIX2.

The pixel array 210 may perform analog binning with respect to the first pixel signal PIX1 and the second pixel signal PIX2 through an external multiplexer MUX. In this case, a result value of the analog binning may be an average value of the first pixel signal PIX1 and the second pixel signal PIX2. The pixel array 210 may output the result value of the analog binning to the ADC circuit 140 of FIG. 2.

In addition, because each column of the pixel array 210 includes four column lines, the pixel array 210 may also perform the same readout operation with respect to the green pixels Gr that are connected to column lines different from the column lines CL_a and CL_b illustrated in FIG. 7.

For example, during the first H-time, pixel values of the blue pixels B of the first unit pixel group UPG1 (e.g., values of charges generated from photoelectric conversion elements of the blue pixels B of the first unit pixel group UPG1) may be summed. At the same time, pixel values of the blue pixels B of the second unit pixel group UPG2 connected to the same column line CL_a as the first unit pixel group UPG1 may be summed. A sum of the pixel values of the blue pixels B of the first unit pixel group UPG1 and the second unit pixel group UPG2 may be output as the first pixel signal PIX1.

Also, at the same time, a sum of the pixel values of the blue pixels B of the third unit pixel group UPG3 and the fourth unit pixel group UPG4 that are respectively located at the same row as the first unit pixel group UPG1 and at the same row as the second unit pixel group UPG2 and are connected to the same column line CL_b may be output as the second pixel signal PIX2.

The pixel array 210 may perform analog binning with respect to the first pixel signal PIX1 and the second pixel signal PIX2 through the external multiplexer MUX. In this case, a result value of the analog binning may be an average value of the first pixel signal PIX1 and the second pixel signal PIX2. The pixel array 210 may output the result value of the analog binning to the ADC circuit 140 of FIG. 2.

In addition, because each column of the pixel array 210 includes four column lines, the pixel array 210 may also perform the same readout operation with respect to the blue pixels B that are connected to column lines different from the column lines CL_a block CL_b illustrated in FIG. 7.

In some embodiments, in the pixel array 210, the readout operations may be alternatingly performed with respect to the green pixels Gr and the blue pixels B of a plurality of unit pixel groups connected to the same column line. For example, when operating in the second binning mode, the pixel array 210 may perform the readout operations on the green pixels Gr of the first to fourth unit pixel groups UPG1 to UPG4 during the first H-time and may perform the readout operations on the blue pixels B of the first to fourth unit pixel groups UPG1 to UPG4 during the second H-time.

The description above with respect to FIG. 7 relates to the readout operations of the green pixels Gr and the blue pixels B of the first to fourth unit pixel groups UPG1 to UPG4 In embodiments, the readout operations of the red pixels R and the green pixels Gb may be performed to be the same as, or similar to, the readout operations of the green pixels Gr and the blue pixels B.

An example in which the first unit pixel group UPG1 and the second unit pixel group UPG2 are adjacent to each other and the third unit pixel group UPG3 and the fourth unit pixel group UPG4 are adjacent to each other is illustrated in FIG. 7, but embodiments are not limited thereto. For example, the pixel array 110 of FIG. 2 may simultaneously read out unit pixel groups that are connected to the same column line and are not adjacent to each other.

Figure 8:
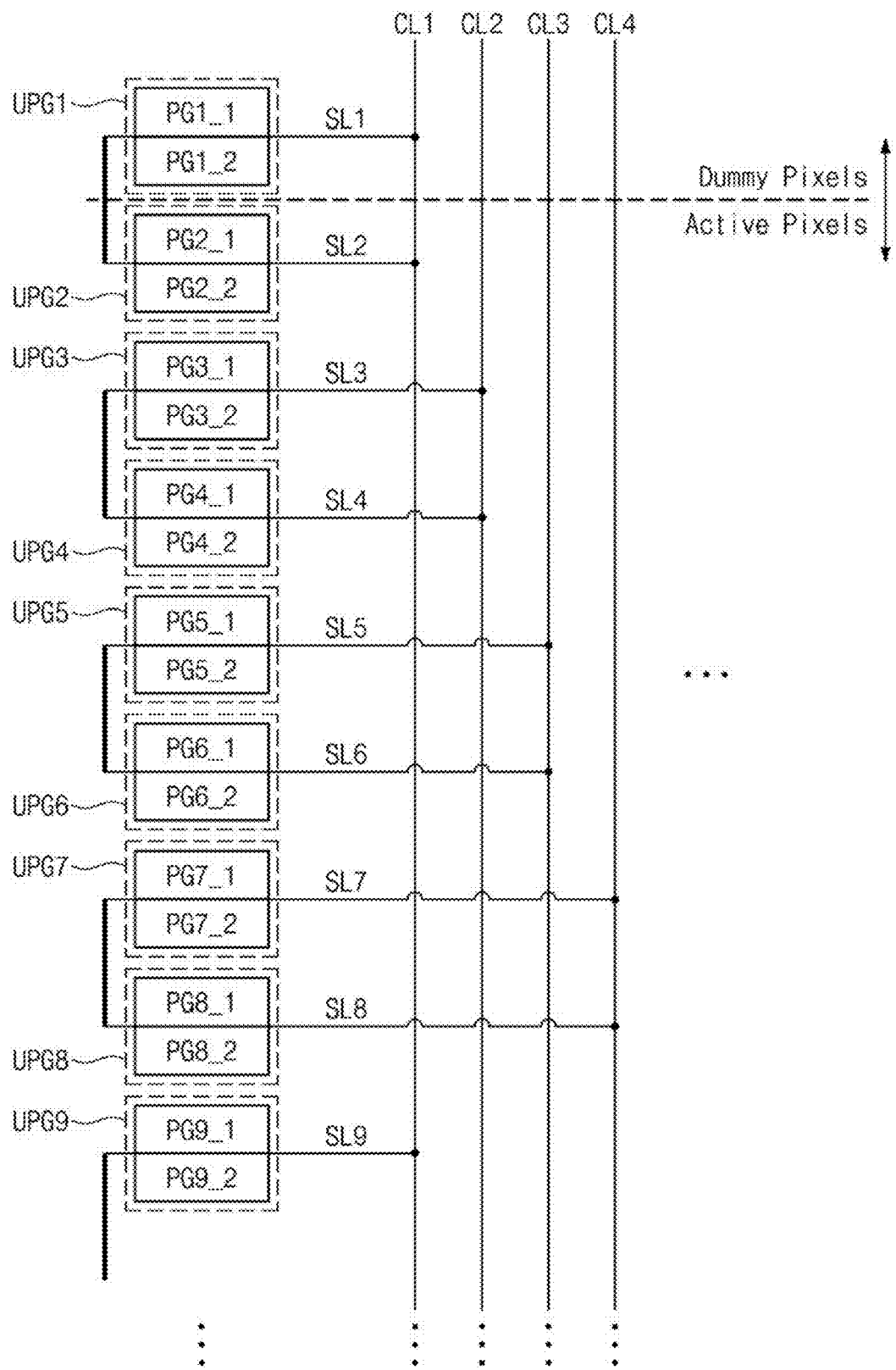
FIG. 8 illustrates an example of a configuration of a pixel array of FIG. 2, according to an embodiment.

FIG. 8 illustrates an example of a configuration of the pixel array 110 of FIG. 2, according to an embodiment of the present disclosure. In FIG. 8, a bold solid line indicates that the second floating diffusion region FD2 is shared. Referring to FIG. 8, a pixel array 310 may include a plurality of unit pixel groups including first to ninth unit pixel groups UPG1 to UPG9.

Each of the plurality of unit pixel groups may include a first pixel group and a second pixel group. For example, the first unit pixel group UPG1 may include first pixel group PG1_1 and second pixel group PG1_2, the second unit pixel group UPG2 may include first pixel group PG2_1 and second pixel group PG2_2, and each of the remaining unit pixel groups other than the first and second unit pixel groups UPG1 and UPG2 may similarly include first second pixel groups.

When the pixel array 310 operates in the binning mode (e.g., the first binning mode or the second binning mode), each of the plurality of unit pixel groups may include two rows. For example, each of the first and second pixel groups of the unit pixel group may correspond to one row. For example, the first unit pixel group UPG1 may be located at the first row and the second row, the second unit pixel group UPG2 may be located at the third row and the fourth row, and each of the remaining unit pixel groups other than the first and second unit pixel groups UPG1 and UPG2 may be similarly located at two rows.

The first pixel groups of the plurality of unit pixel groups may include pixels of the same color, the second pixel groups of the plurality of unit pixel groups may include pixels of the same color, and the color of the pixels of the first pixel groups may be different from the color of the pixels of the second pixel groups. For example, the pixels of the first pixel groups PG1_1 to PG9_1 may be the green pixels Gr, and the pixels of the second pixel groups PG1_2 to PG9_2 may be the blue pixels B.

Each of the plurality of pixel groups of the pixel array 310 may include first to fourth pixels. The first pixel may be disposed on the left top of the pixel group, the second pixel may be disposed on the right top of the pixel group, the third pixel may be disposed on the left bottom of the pixel group, and the fourth pixel may be disposed on the right bottom of the pixel group. For example, the first pixel and the second pixel may be disposed side by side in the X-axis direction, the third pixel and the fourth pixel may be disposed side by side in the X-axis direction, the first pixel and the third pixel may be disposed side by side in the Y-axis direction, and the second pixel and the fourth pixel may be disposed side by side in the Y-axis direction.

The first unit pixel group UPG1 may be a dummy unit pixel group including dummy pixels, which may refer to inactive pixels, and the remaining unit pixel groups other than the first unit pixel group UPG1 among the plurality of unit pixel groups may include active pixels.

Two unit pixel groups sharing the second floating diffusion region FD2 from among the plurality of unit pixel groups may be connected to the same column line. Two unit pixel groups not sharing the second floating diffusion region FD2 from among the plurality of unit pixel groups may be connected to different column lines.

For example, the first unit pixel group UPG1 and the second unit pixel group UPG2 sharing the second floating diffusion region FD2 may be connected to the first column line CL1 through the first signal line SL1 and the second signal line SL2, respectively; the third unit pixel group UPG3 and the fourth unit pixel group UPG4 sharing the second floating diffusion region FD2 may be connected to the second column line CL2 through a third signal line SL3 and a fourth signal line SL4, respectively; the fifth unit pixel group UPG5 and the sixth unit pixel group UPG6 sharing the second floating diffusion region FD2 may be connected to the third column line CL3 through a fifth signal line SL5 and a sixth signal line SL6, respectively; the seventh unit pixel group UPG7 and the eighth unit pixel group UPG8 sharing the second floating diffusion region FD2 may be connected to the fourth column line CL4 through a seventh signal line SL7 and an eighth signal line SL8, respectively; and similarly, the remaining unit pixel groups other than the first to eighth unit pixel groups UPG1 to UPG8 may be repeatedly connected to the first to fourth column lines CL1 to CL4 in the same manner as the first to eighth unit pixel groups UPG1 to UPG8.

Each of two unit pixel groups sharing the second floating diffusion region FD2 may transfer a pixel signal through a signal line of the other unit pixel group sharing the second floating diffusion region FD2 in the readout operation. For example, based on the first unit pixel group UPG1 being read out, the pixel signal generated from the first unit pixel group UPG1 may be transferred to the first column line CL1 through the first signal line SL1 of the first unit pixel group UPG1 and the second signal line SL2 of the second unit pixel group UPG2 (e.g., based on the select transistors of the first and second unit pixel groups UPG1 and UPG2 being turned on), and the remaining unit pixel groups sharing the second unit pixel group UPG2 may be read out in the same manner.

FIGS. 9A to 9D illustrate an example of a readout operation of the pixel array 310 of FIG. 8, according to an embodiment of the present disclosure. The description below relates to an example in which the first pixel groups of the pixel array 310 include the green pixels Gr and the second pixel groups of the pixel array 310 include the blue pixels B.

Referring to FIGS. 8 and 9A to 9D, the pixel array 310 may operate in the full mode. When operating in the full mode, the pixel array 310 may simultaneously read out two pixels having the same color from among pixels of two unit pixel groups that are connected to different column lines and do not share the second floating diffusion region FD2. In detail, the pixel array 310 may read out one pixel for each of two unit pixel groups that are connected to different column lines and do not share the second floating diffusion region FD2. In embodiments, the two pixels read out at the same time may be of the same color.

Figure 9A:
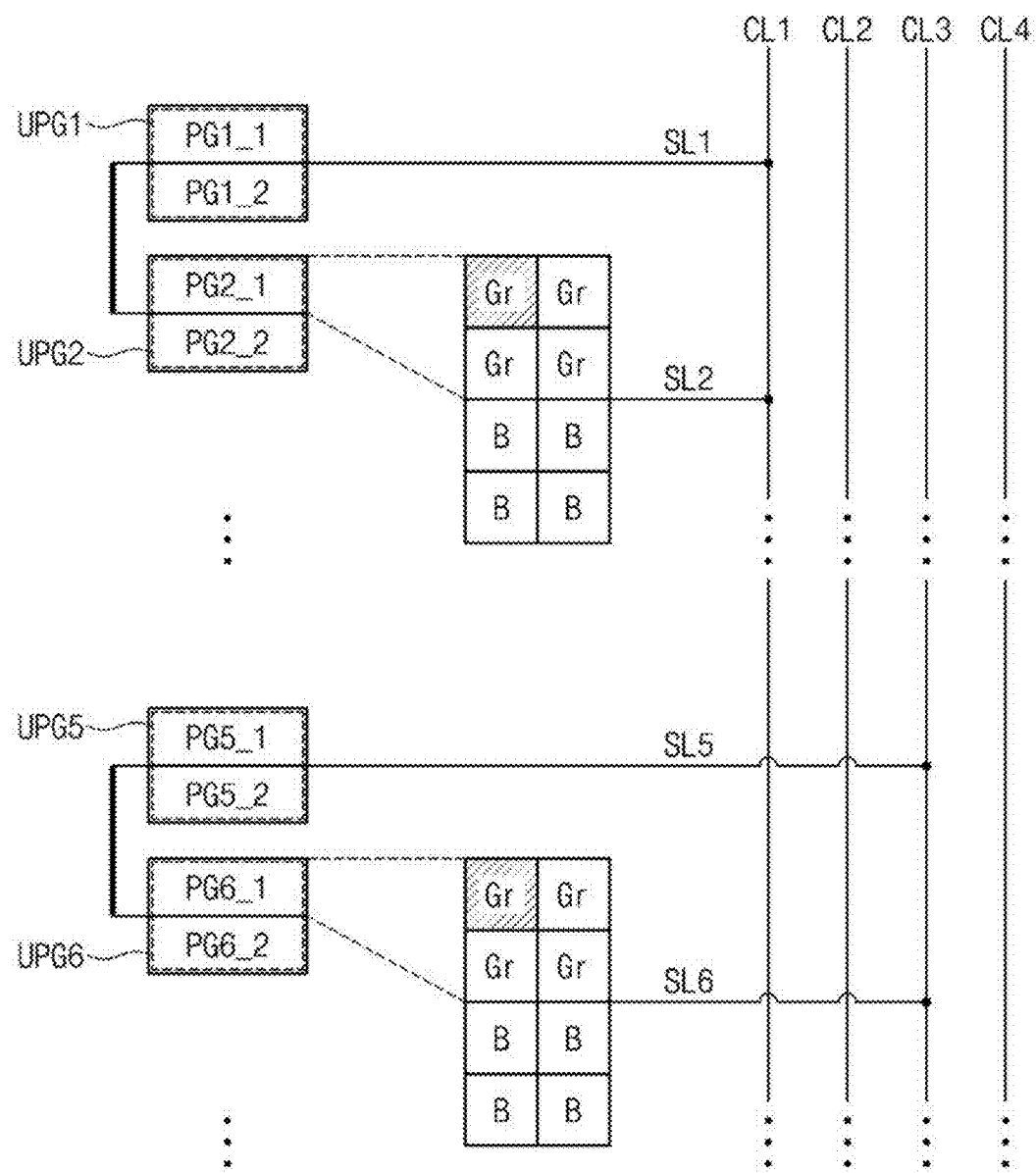
FIGS. 9A to 9D illustrate an example of a readout operation of a pixel array FIG. 8, according to an embodiment.

For example, referring to FIG. 9A, during the first H-time, the pixel array 310 may read out the first pixel being the green pixel Gr of the second unit pixel group UPG2. At the same time, the pixel array 310 may read out the first pixel being the green pixel Gr of the sixth unit pixel group UPG6.

A pixel signal generated based on the green pixel Gr of the second unit pixel group UPG2 may be transferred to the first column line CL1 through the second signal line SL2 and the first signal line SL1 of the first unit pixel group UPG1 sharing the second floating diffusion region FD2 with the second unit pixel group UPG2.

A pixel signal generated based on the green pixel Gr of the sixth unit pixel group UPG6 may be transferred to the third column line CL3 through the sixth signal line SL6 and the fifth signal line SL5 of the fifth unit pixel group UPG5 sharing the second floating diffusion region FD2 with the sixth unit pixel group UPG6.

Figure 9B:
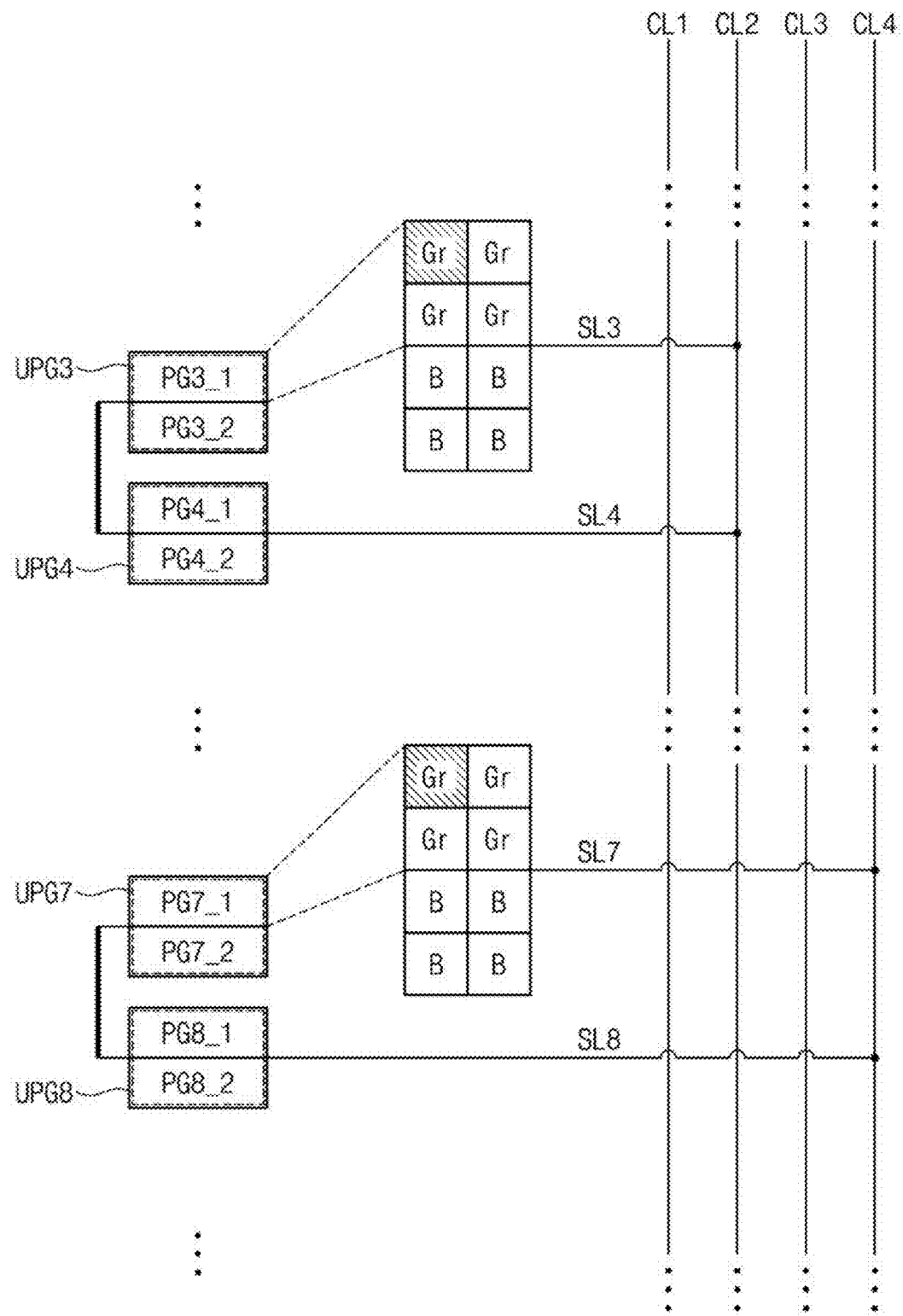

For example, referring to FIG. 9B, during the second H-time, the pixel array 310 may read out the first pixel being the green pixel Gr of the third unit pixel group UPG3. At the same time, the pixel array 310 may read out the first pixel being the green pixel Gr of the seventh unit pixel group UPG7.

A pixel signal generated based on the green pixel Gr of the third unit pixel group UPG3 may be transferred to the second column line CL2 through the third signal line SL3 and the fourth signal line SL4 of the fourth unit pixel group UPG4 sharing the second floating diffusion region FD2 with the third unit pixel group UPG3.

A pixel signal generated based on the green pixel Gr of the seventh unit pixel group UPG7 may be transferred to the fourth column line CL4 through the seventh signal line SL7 and the eighth signal line SL8 of the eighth unit pixel group UPG8 sharing the second floating diffusion region FD2 with the seventh unit pixel group UPG7.

Figure 9C:
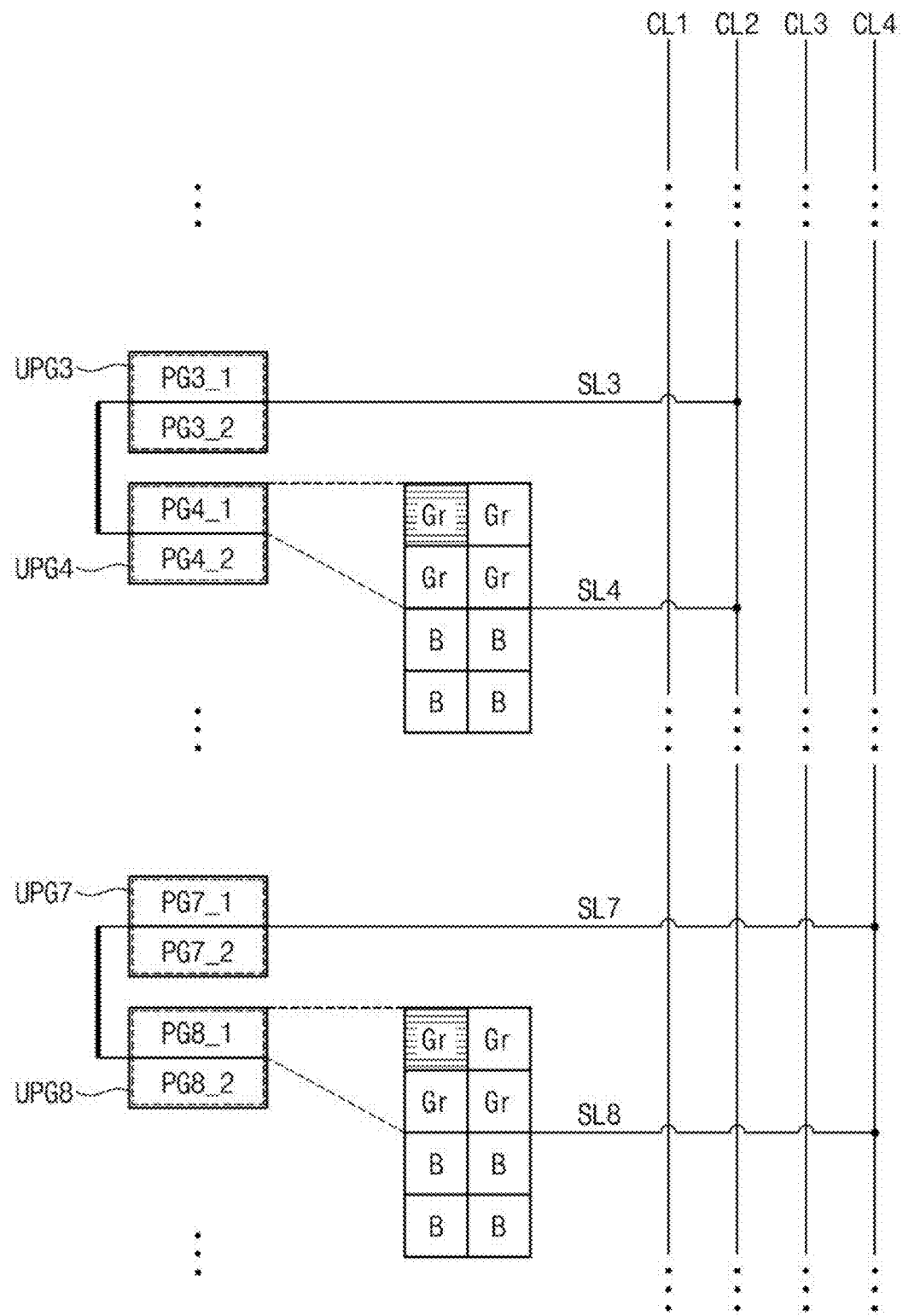

For example, referring to FIG. 9C, during the third H-time, the pixel array 310 may read out the first pixel being the green pixel Gr of the fourth unit pixel group UPG4. At the same time, the pixel array 310 may read out the first pixel being the green pixel Gr of the eighth unit pixel group UPG8.

A pixel signal generated based on the green pixel Gr of the fourth unit pixel group UPG4 may be transferred to the second column line CL2 through the fourth signal line SLA and the third signal line SL3 of the third unit pixel group UPG3 sharing the second floating diffusion region FD2 with the fourth unit pixel group UPG4.

A pixel signal generated based on the green pixel Gr of the eighth unit pixel group UPG8 may be transferred to the fourth column line CL4 through the eighth signal line SL8 and the seventh signal line SL7 of the seventh unit pixel group UPG7 sharing the second floating diffusion region FD2 with the eighth unit pixel group UPG8.

Figure 9D:
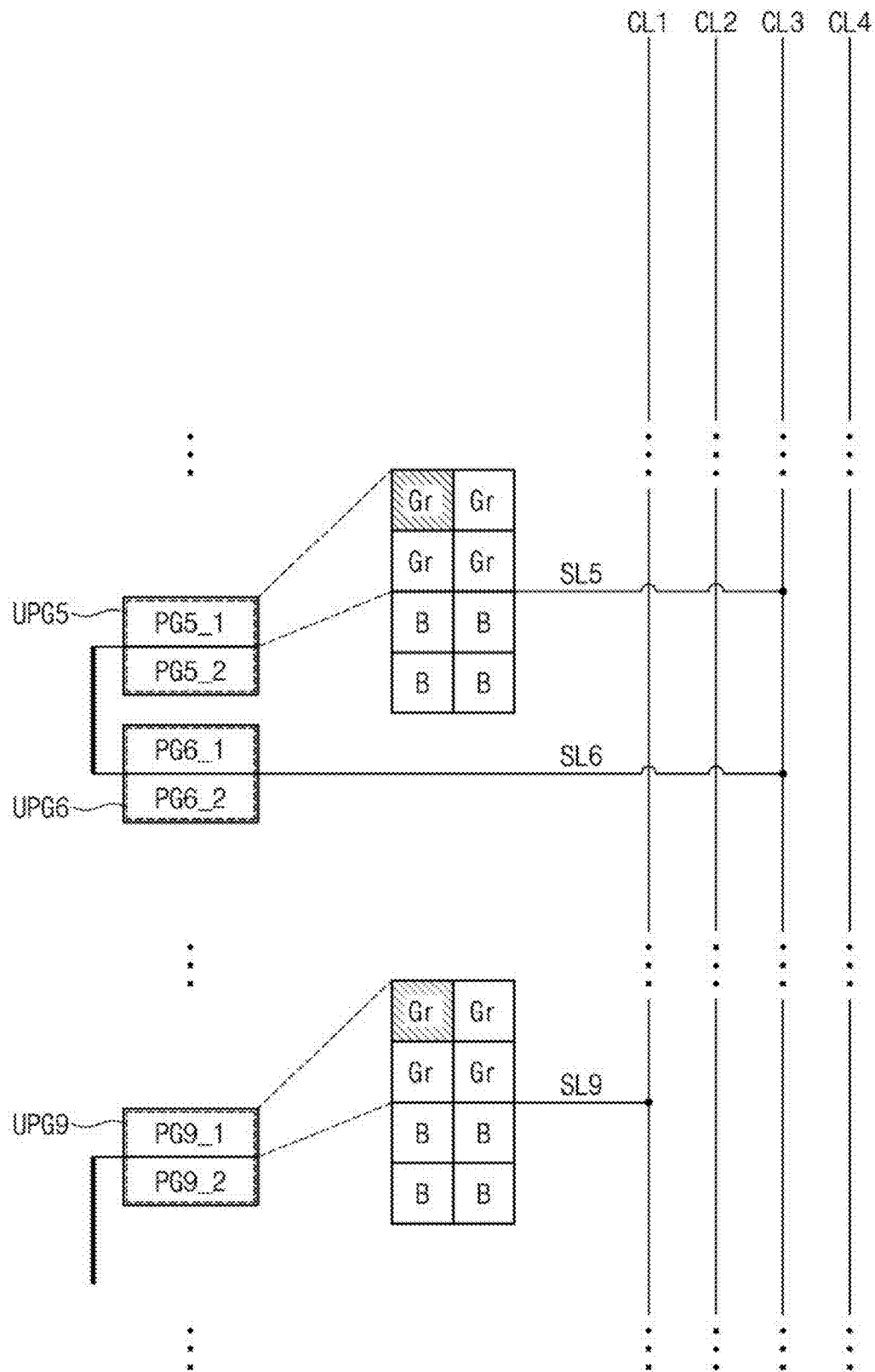

For example, referring to FIG. 9D, during the fourth H-time, the pixel array 310 may read out the first pixel being the green pixel Gr of the fifth unit pixel group UPG5. At the same time, the pixel array 310 may read out the first pixel being the green pixel Gr of the ninth unit pixel group UPG9.

A pixel signal generated based on the green pixel Gr of the fifth unit pixel group UPG5 may be transferred to the third column line CL3 through the fifth signal line SL5 and the sixth signal line SL6 of the sixth unit pixel group UPG6 sharing the second floating diffusion region FD2 with the fifth unit pixel group UPG5.

A pixel signal generated based on the green pixel Gr of the ninth unit pixel group UPG9 may be transferred to the first column line CL1 through a ninth signal line SL9 and a tenth signal line of a tenth unit pixel group sharing the second floating diffusion region FD2 with the ninth unit pixel group UPG9.

As described above, when the pixel array 310 operates in the full mode, pixel signals output from two unit pixel groups not sharing the second floating diffusion region FD2 may be output through two different column lines. In this case, two column lines, which are not used to transfer pixel signals, from among the four column lines may be used as a shielding line preventing the coupling between column lines. The influence between output lines may be minimized by using two of four column lines as a shielding line, and thus, a ghost phenomenon of an image sensor may be prevented or reduced.

Figure 10:
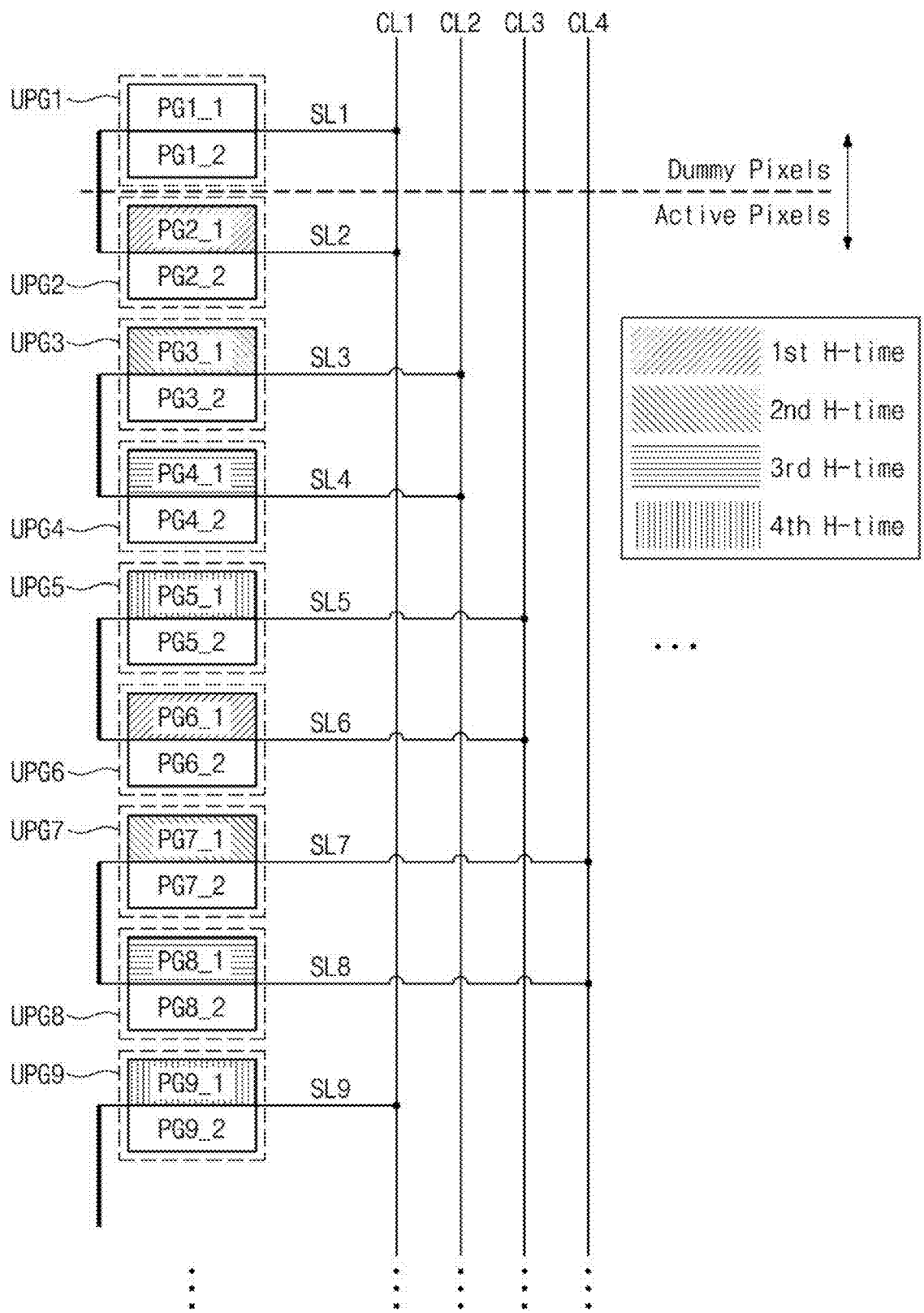
FIG. 10 illustrates an example of a readout operation of a pixel array FIG. 8, according to an embodiment.

FIG. 10 illustrates an example of a readout operation of the pixel array 310 of FIG. 8, according to an embodiment of the present disclosure. Referring to FIGS. 8 and 10, the pixel array 310 may operate in the first binning mode. When operating in the full mode, the pixel array 310 may simultaneously read out two pixels having the same color from among pixels of two unit pixel groups that are connected to different column lines and do not share the second floating diffusion region FD2. For example, the pixel array 310 may generate a pixel signal by summing pixel values from the pixels of the same color, which belong to the two unit pixel groups connected to different column lines and not sharing the second floating diffusion region FD2.

For example, during the first H-time, the pixel array 310 may read out the green pixels Gr of the second unit pixel group UPG2. For example, a pixel signal may be generated by summing the pixel values of the green pixels Gr of the second unit pixel group UPG2. At the same time, the pixel array 310 may read out the green pixels Gr of the sixth unit pixel group UPG6. For example, a pixel signal may be generated by summing the pixel values of the green pixels Gr of the sixth unit pixel group UPG6.

The pixel signal generated by summing the pixel values of the green pixels Gr of the second unit pixel group UPG2 may be transferred to the first column line CL1 through the second signal line SL2 and the first signal line SL1 of the first unit pixel group UPG1 sharing the second floating diffusion region FD2 with the second unit pixel group UPG2.

The pixel signal generated by summing the green pixels Gr of the sixth unit pixel group UPG6 may be transferred to the third column line CL3 through the sixth signal line SL6 and the fifth signal line SL5 of the fifth unit pixel group UPG5 sharing the second floating diffusion region FD2 with the sixth unit pixel group UPG6.

For example, during the second H-time, the pixel array 310 may read out the green pixels Gr of the third unit pixel group UPG3. For example, a pixel signal may be generated by summing the pixel values of the green pixels Gr of the third unit pixel group UPG3. At the same time, the pixel array 310 may read out the green pixels Gr of the seventh unit pixel group UPG7. For example, a pixel signal may be generated by summing the pixel values of the green pixels Gr of the seventh unit pixel group UPG7.

The pixel signal generated by summing the pixel values of the green pixels Gr of the third unit pixel group UPG3 may be transferred to the second column line CL2 through the third signal line SL3 and the fourth signal line SL4 of the fourth unit pixel group UPG4 sharing the second floating diffusion region FD2 with the third unit pixel group UPG3.

The pixel signal generated by summing the pixel values of the green pixels Gr of the seventh unit pixel group UPG7 may be transferred to the fourth column line CL4 through the seventh signal line SL7 and the eighth signal line SL8 of the eighth unit pixel group UPG8 sharing the second floating diffusion region FD2 with the seventh unit pixel group UPG7.

For example, during the third H-time, the pixel array 310 may read out the green pixels Gr of the fourth unit pixel group UPG4. For example, a pixel signal may be generated by summing the pixel values of the green pixels Gr of the fourth unit pixel group UPG4. At the same time, the pixel array 310 may read out the green pixels Gr of the eighth unit pixel group UPG8. For example, a pixel signal may be generated by summing the pixel values of the green pixels Gr of the eighth unit pixel group UPG8.

The pixel signal generated by summing the pixel values of the green pixels Gr of the fourth unit pixel group UPG4 may be transferred to the second column line CL2 through the fourth signal line SLA and the third signal line SL3 of the third unit pixel group UPG3 sharing the second floating diffusion region FD2 with the fourth unit pixel group UPG4.

The pixel signal generated by summing the pixel values of the green pixels Gr of the eighth unit pixel group UPG8 may be transferred to the fourth column line CLA through the eighth signal line SL8 and the seventh signal line SL7 of the seventh unit pixel group UPG7 sharing the second floating diffusion region FD2 with the eighth unit pixel group UPG8.

For example, during the fourth H-time, the pixel array 310 may read out the green pixels Gr of the fifth unit pixel group UPG5. For example, a pixel signal may be generated by summing the pixel values of the green pixels Gr of the fifth unit pixel group UPG5. At the same time, the pixel array 310 may read out the green pixels Gr of the ninth unit pixel group UPG9. For example, a pixel signal may be generated by summing the pixel values of the green pixels Gr of the ninth unit pixel group UPG9.

The pixel signal generated by summing the green pixels Gr of the fifth unit pixel group UPG5 may be transferred to the third column line CL3 through the fifth signal line SL5 and the sixth signal line SL6 of the sixth unit pixel group UPG6 sharing the second floating diffusion region FD2 with the fifth unit pixel group UPG5.

The pixel signal generated by summing the pixel values of the green pixels Gr of the ninth unit pixel group UPG9 may be transferred to the first column line CL1 through the ninth signal line SL9 and the tenth signal line of the tenth unit pixel group sharing the second floating diffusion region FD2 with the ninth unit pixel group UPG9.

As described above, when the pixel array 310 operates in the first binning mode, pixel signals output from two unit pixel groups not sharing the second floating diffusion region FD2 may be output through two different column lines. In this case, two column lines, which are not used to transfer pixel signals, from among the four column lines may be used as a shielding line preventing the coupling between column lines. The influence between output lines may be minimized by using two of four column lines as a shielding line, and thus, a ghost phenomenon of an image sensor may be prevented.

Figure 11:
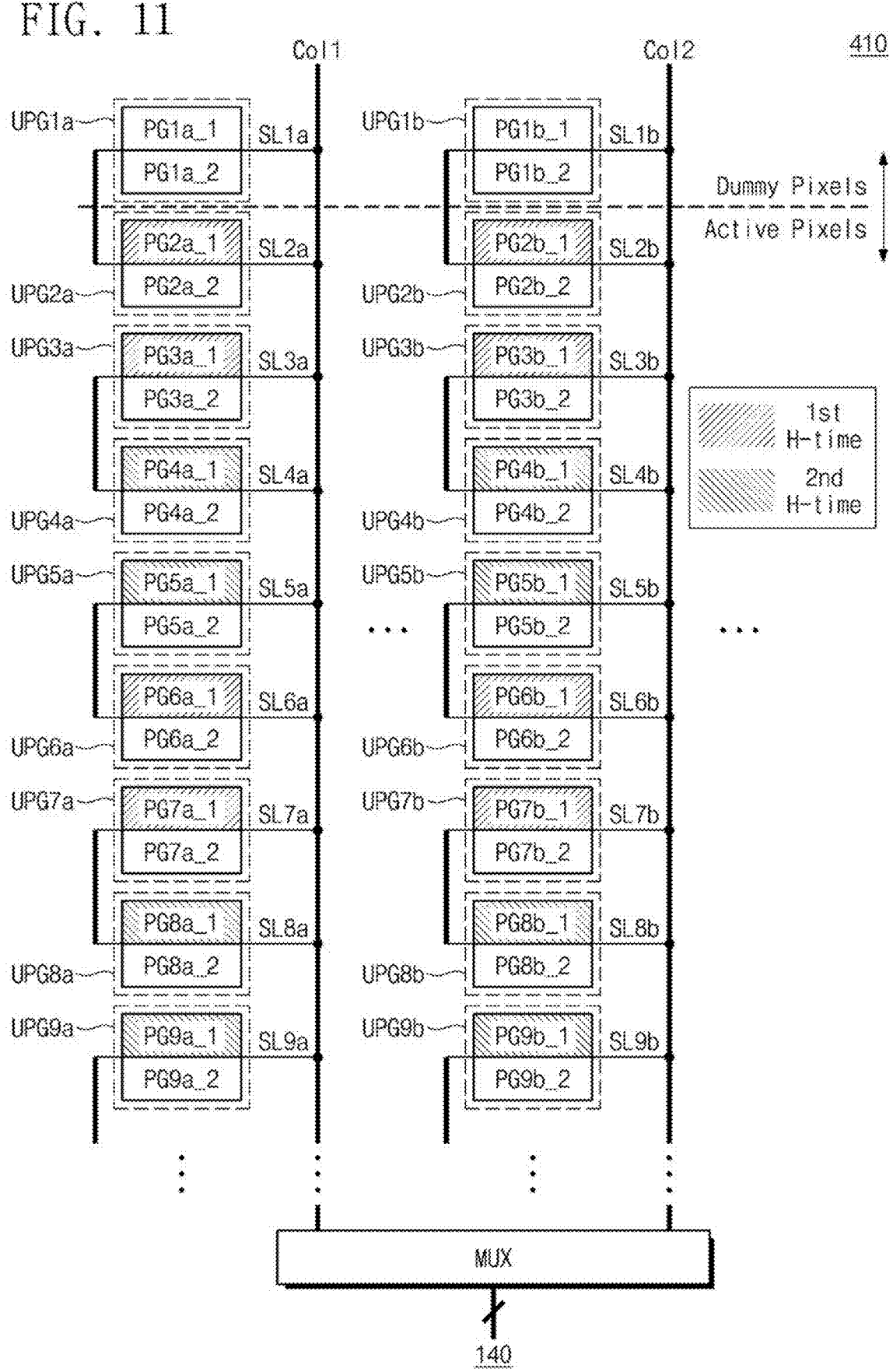
FIG. 11 illustrates an example of a readout operation in the configuration of a pixel array FIG. 2, according to an embodiment.

FIG. 11 illustrates an example of a readout operation in the configuration of the pixel array 110 of FIG. 2, according to an embodiment of the present disclosure. Like FIG. 8, in FIG. 11, a bold solid line indicates that the second floating diffusion region FD2 is shared. Referring to FIG. 11, the pixel array 310 may include a plurality of unit pixel groups including first to ninth unit pixel groups UPG1a to UPG9a connected to a first column Col1 and first to ninth unit pixel groups UPG1b to UPG9b connected to a second column Col2. Each of the first column Col1 and the second column Col2 may include four column lines.

The first to ninth unit pixel groups UPG1a to UPG9a connected to the first column Col1 and the first to ninth unit pixel groups UPG1b to UPG9b connected to the second column Col2 may correspond to the first to ninth unit pixel groups UPG1 to UPG9 of FIG. 8, and thus, additional description may be omitted to avoid redundancy.

Row locations of the first to ninth unit pixel groups UPG1a to UPG9a connected to the first column Col1 may be respectively identical to row locations of the first to ninth unit pixel groups UPG1b to UPG9b connected to the second column Col2.

In a pixel array 410 illustrated in FIG. 11, examples of the readout operation of the green pixels Gr of a plurality of unit pixel groups are described in which first pixel groups of the plurality of unit pixel groups connected to the first column Col1 and the plurality of unit pixel groups connected to the second column Col2 include the green pixels Gr and second pixel groups thereof include the blue pixels B, however embodiments are not limited thereto.

The pixel array 410 may operate in the second binning mode. The second binning mode may refer to a mode in which pixels of the same color located at a plurality of rows are simultaneously read out by using analog binning.

For example, during the first H-time, the pixel array 410 may perform the readout operations with respect to the pixels of the first pixel groups PG2a_1, PG2b_1, PG3a_1, and PG3b_1 of the second unit pixel groups UPG2a and UPG2b and the third unit pixel groups UPG3a and UPG3b, and may simultaneously perform the readout operations with respect to the pixels of the first pixel groups PG6a_1, PG6b_1, PG7a_1, and PG7b_1 of the sixth unit pixel groups UPG6a and UPG6b and the seventh unit pixel groups UPG7a and UPG7b.

For example, during the first H-time, pixel values of the green pixels Gr of the second unit pixel group UPG2a connected to a column line of the first column Col1 may be summed as a pixel signal. At the same time, pixel values of the green pixels Gr of the third unit pixel group UPG3a connected to a column line different from that of the second unit pixel group UPG2a may be summed as a pixel signal. Also, at the same time, pixel values of the green pixels Gr of the second unit pixel group UPG2b that is located at the same row as the second unit pixel group UPG2a and is connected to a column line of the second column Col2 may be summed as a pixel signal, and pixel values of the green pixels Gr of the third unit pixel group UPG3b that is located at the same row as the third unit pixel group UPG3a and is connected to a column line different from that of the second unit pixel group UPG2b.

The pixel array 410 may perform analog binning with respect to the pixel signals of the green pixels Gr of the second and third unit pixel groups UPG2a and UPG3a connected to the first column Col1 and the second and third unit pixel groups UPG2b and UPG3b connected to the second column Col2, through the external multiplexer MUX of the pixel array 410. In this case, a result value of the analog binning may be an average value of the pixel signals. The pixel array 410 may output the result value of the analog binning to the ADC circuit 140 of FIG. 2.

Also, during the first H-time, the readout operations may be similarly performed with respect to the green pixels Gr of the sixth and seventh unit pixel groups UPG6a and UPG7a connected to the first column Col1, and the green pixels Gr of the sixth and seventh unit pixel groups UPG6b and UPG7b connected to the second column Col2.

For example, during the second H-time, the pixel array 410 may perform the readout operations with respect to the pixels of the first pixel groups PG4a_1, PG4b_1, PG5a_1, and PG5b_1 of the fourth unit pixel groups UPG4a and UPG4b and the fifth unit pixel groups UPG5a and UPG5b, and may simultaneously perform the readout operations with respect to the pixels of the first pixel groups PG8a_1, PG8b_1, PG9a_1, and PG9b_1 of the eighth unit pixel groups UPG8a and UPG8b and the ninth unit pixel groups UPG9a and UPG9b.

For example, during the second H-time, pixel values of the green pixels Gr of the fourth unit pixel group UPG4a connected to a column line of the first column Col1 may be summed as a pixel signal. At the same time, pixel values of the green pixels Gr of the fifth unit pixel group UPG5a connected to a column line different from that of the fourth unit pixel group UPG4a may be summed as a pixel signal. Also, at the same time, pixel values of the green pixels Gr of the fourth unit pixel group UPG4b that is located at the same row as the fourth unit pixel group UPG4a and is connected to a column line of the second column Col2 may be summed as a pixel signal, and pixel values of the green pixels Gr of the fifth unit pixel group UPG5b that is located at the same row as the fifth unit pixel group UPG5a and is connected to a column line different from that of the fourth unit pixel group UPG4b.

The pixel array 410 may perform analog binning with respect to the pixel signals of the green pixels Gr of the fourth and fifth unit pixel groups UPG4a and UPG5a connected to the first column Col1 and the fourth and fifth unit pixel groups UPG4b and UPG5b connected to the second column Col2, through the external multiplexer MUX of the pixel array 410. In this case, a result value of the analog binning may be an average value of the pixel signals. The pixel array 410 may output the result value of the analog binning to the ADC circuit 140 of FIG. 2.

Also, during the second H-time, the readout operations may be similarly performed with respect to the green pixels Gr of the eighth and ninth unit pixel groups UPG8a and UPG9a connected to the first column Col1, and the green pixels Gr of the eighth and ninth unit pixel groups UPG8b and UPG9b connected to the second column Col2.

Figure 12A:
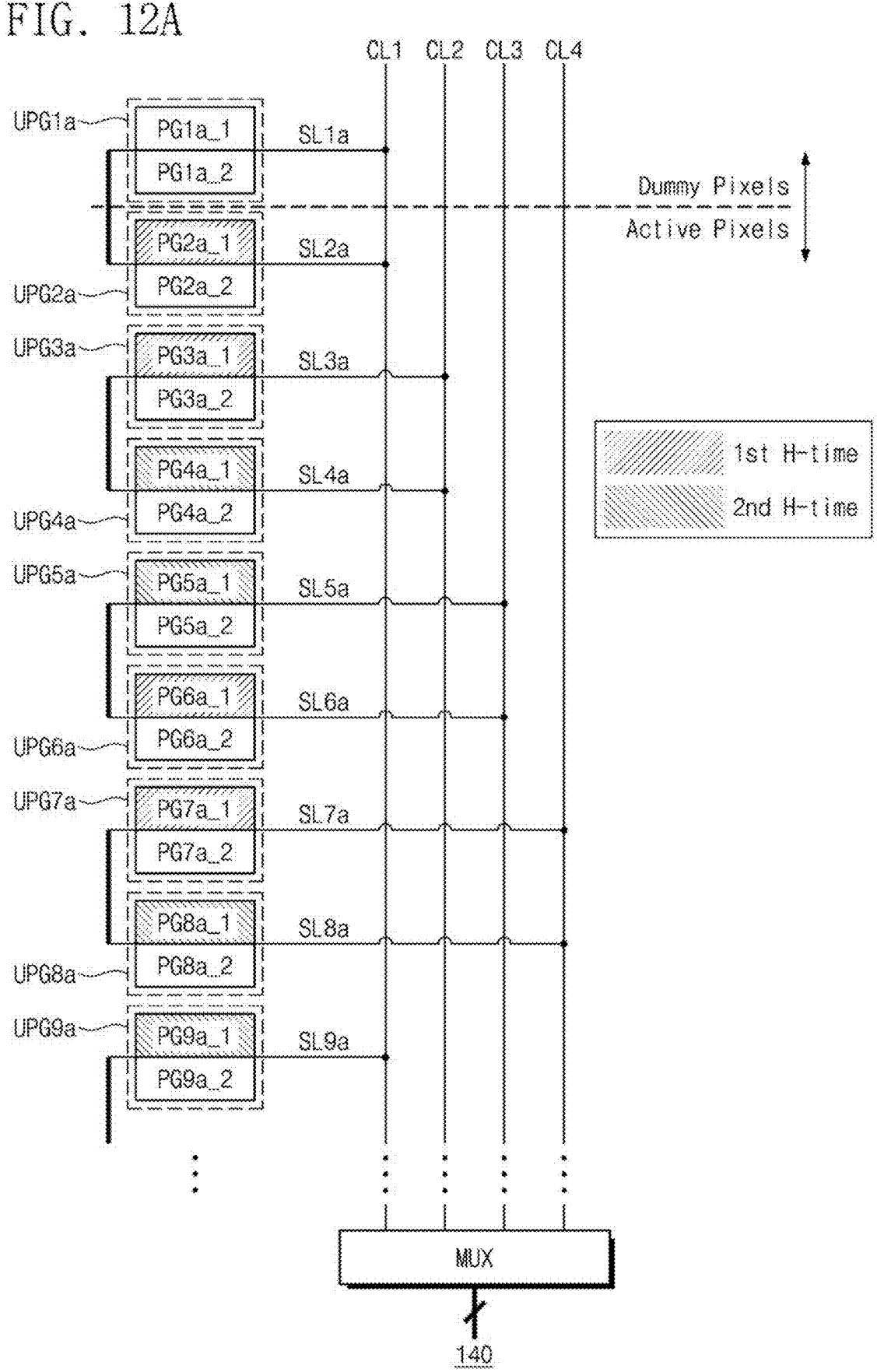
FIGS. 12A and 12B illustrate a readout operation of FIG. 11, according to an embodiment.
Figure 12B:
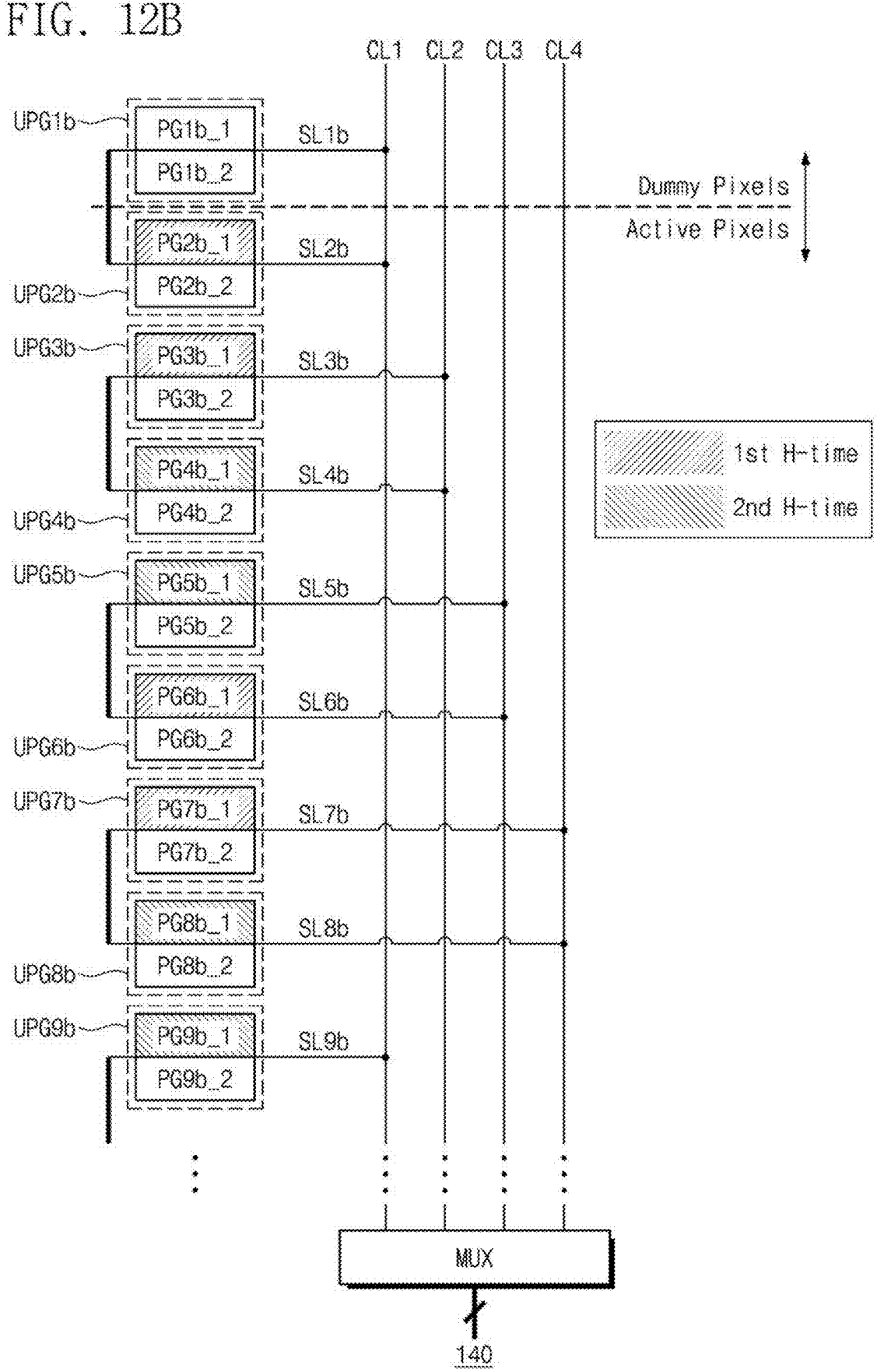

FIGS. 12A and 12B illustrate a readout operation of FIG. 11 in detail. FIG. 12A shows how the readout operations are performed with respect to a plurality of unit pixel groups connected to the first column Col1 in the second binning mode, and FIG. 12B shows how the readout operations are performed with respect to a plurality of unit pixel groups connected to the second column Col2 in the second binning mode.

Referring to FIGS. 12A and 12B, each of two unit pixel groups sharing the second floating diffusion region FD2 may transfer a pixel signal through a signal line of the other unit pixel group sharing the second floating diffusion region FD2 in the readout operation.

For example, as illustrated in FIG. 12A, during the first H-time, a pixel signal generated by summing pixel values of the green pixels Gr of the second unit pixel group UPG2a may be transferred to the first column line CL1 through a second signal line SL2a and a first signal line SL1a of the first unit pixel group UPG1a sharing the second floating diffusion region FD2 with the second unit pixel group UPG2a.

At the same time, a pixel signal generated by summing pixel values of the green pixels Gr of the third unit pixel group UPG3a may be transferred to the second column line CL2 through a third signal line SL3a and a fourth signal line SLAa of the fourth unit pixel group UPG4a sharing the second floating diffusion region FD2 with the third unit pixel group UPG3a.

At the same time, a pixel signal generated by summing the green pixels Gr of the sixth unit pixel group UPG6a may be transferred to the third column line CL3 through a sixth signal line SL6a and a fifth signal line SL5a of the fifth unit pixel group UPG5a sharing the second floating diffusion region FD2 with the sixth unit pixel group UPG6a.

At the same time, a pixel signal generated by summing the pixel values of the green pixels Gr of the seventh unit pixel group UPG7a may be transferred to the fourth column line CL4 through a seventh signal line SL7a and an eighth signal line SL8a of the eighth unit pixel group UPG8a sharing the second floating diffusion region FD2 with the seventh unit pixel group UPG7a.

For example, as illustrated in FIG. 12A, during the second H-time, a pixel signal generated by summing pixel values of the green pixels Gr of the fourth unit pixel group UPG4a may be transferred to the second column line CL2 through the fourth signal line SLAa and the third signal line SL3a of the third unit pixel group UPG3a sharing the second floating diffusion region FD2 with the fourth unit pixel group UPG4a.

At the same time, a pixel signal generated by summing the green pixels Gr of the fifth unit pixel group UPG5a may be transferred to the third column line CL3 through the fifth signal line SL5a and the sixth signal line SL6a of the sixth unit pixel group UPG6a sharing the second floating diffusion region FD2 with the fifth unit pixel group UPG5a.

At the same time, a pixel signal generated by summing the pixel values of the green pixels Gr of the eighth unit pixel group UPG8a may be transferred to the fourth column line CL4 through the eighth signal line SL8a and the seventh signal line SL7a of the seventh unit pixel group UPG7a sharing the second floating diffusion region FD2 with the eighth unit pixel group UPG8a.

At the same time, a pixel signal generated by summing the pixel values of the green pixels Gr of the ninth unit pixel group UPG9a may be transferred to the first column line CL1 through the ninth signal line SL9a and a tenth signal line of a tenth unit pixel group sharing the second floating diffusion region FD2 with the ninth unit pixel group UPG9a.

For example, as illustrated in FIG. 12B, during the first H-time, a pixel signal generated by summing pixel values of the green pixels Gr of the second unit pixel group UPG2b may be transferred to the first column line CL1 through a second signal line SL2b and a first signal line SL1b of the first unit pixel group UPG1b sharing the second floating diffusion region FD2 with the second unit pixel group UPG2b.

At the same time, a pixel signal generated by summing pixel values of the green pixels Gr of the third unit pixel group UPG3b may be transferred to the second column line CL2 through a third signal line SL3b and a fourth signal line SL4b of the fourth unit pixel group UPG4b sharing the second floating diffusion region FD2 with the third unit pixel group UPG3b.

At the same time, a pixel signal generated by summing the green pixels Gr of the sixth unit pixel group UPG6b may be transferred to the third column line CL3 through a sixth signal line SL6b and a fifth signal line SL5b of the fifth unit pixel group UPG5b sharing the second floating diffusion region FD2 with the sixth unit pixel group UPG6b.

At the same time, a pixel signal generated by summing the pixel values of the green pixels Gr of the seventh unit pixel group UPG7b may be transferred to the fourth column line CL4 through a seventh signal line SL7b and an eighth signal line SL8b of the eighth unit pixel group UPG8b sharing the second floating diffusion region FD2 with the seventh unit pixel group UPG7b.

For example, as illustrated in FIG. 12B, during the second H-time, a pixel signal generated by summing pixel values of the green pixels Gr of the fourth unit pixel group UPG4b may be transferred to the second column line CL2 through the fourth signal line SL4b and the third signal line SL3a of the third unit pixel group UPG3b sharing the second floating diffusion region FD2 with the fourth unit pixel group UPG4b.

At the same time, a pixel signal generated by summing the green pixels Gr of the fifth unit pixel group UPG5b may be transferred to the third column line CL3 through the fifth signal line SL5b and the sixth signal line SL6b of the sixth unit pixel group UPG6b sharing the second floating diffusion region FD2 with the fifth unit pixel group UPG5b.

At the same time, a pixel signal generated by summing the pixel values of the green pixels Gr of the eighth unit pixel group UPG8b may be transferred to the fourth column line CL4 through the eighth signal line SL8b and the seventh signal line SL7b of the seventh unit pixel group UPG7b sharing the second floating diffusion region FD2 with the eighth unit pixel group UPG8b.

At the same time, a pixel signal generated by summing the pixel values of the green pixels Gr of the ninth unit pixel group UPG9b may be transferred to the first column line CL1 through a ninth signal line SL9b and a tenth signal line of a tenth unit pixel group sharing the second floating diffusion region FD2 with the ninth unit pixel group UPG9b.

As described above, when each column of the pixel array 410 includes four column lines, the unit pixel group of the pixel array 410 operating in the second binning mode may transfer a pixel signal by using a signal line of the other unit pixel group sharing the second floating diffusion region FD2. For example, as the number of drive transistors operating as a source follower amplifier increases, the transconductance may increase, and the noise of the output image may decrease.

Figure 13:
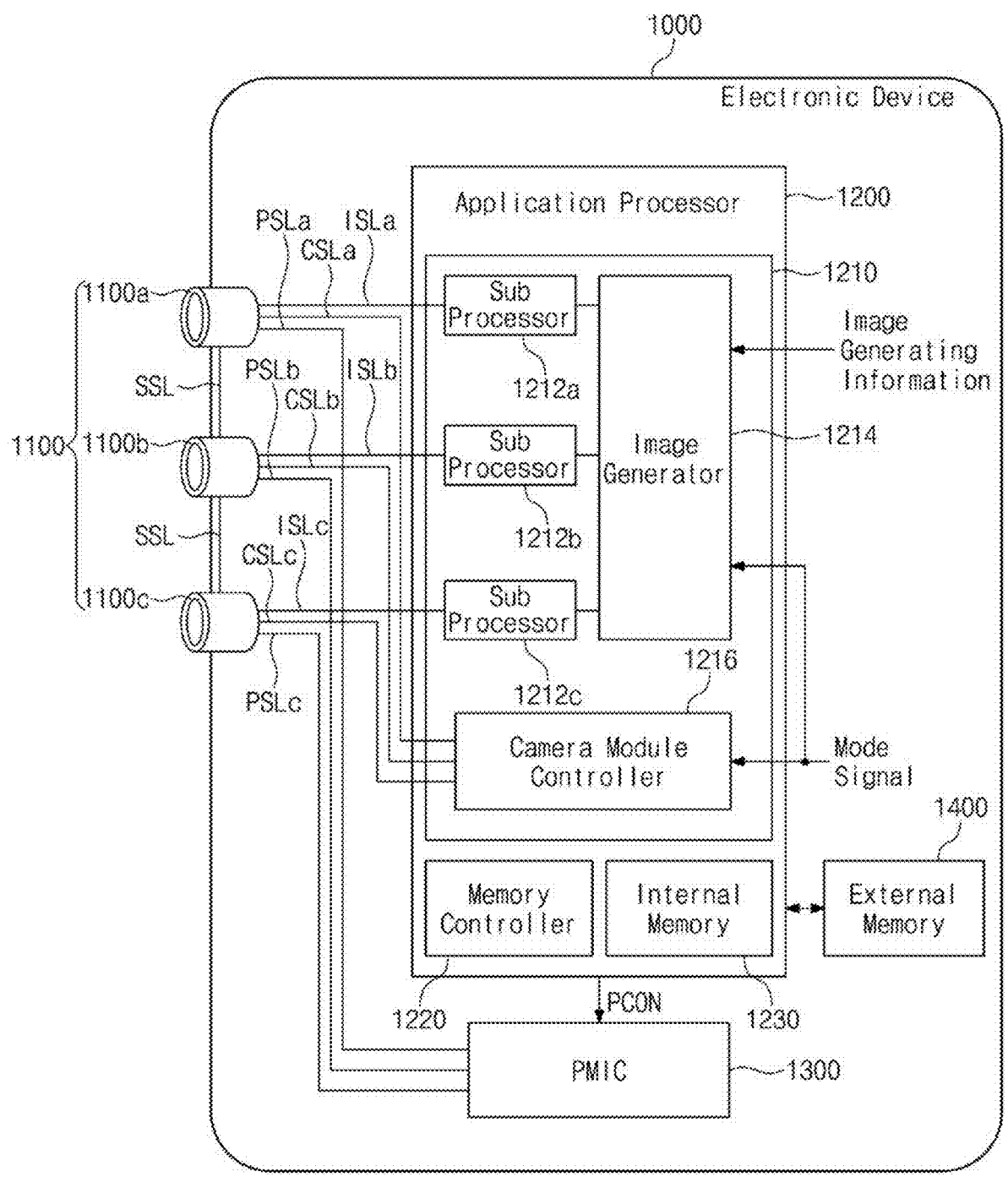
FIG. 13 illustrates an example of a configuration of an electronic device including an image sensor according to an embodiment.
Figure 14:
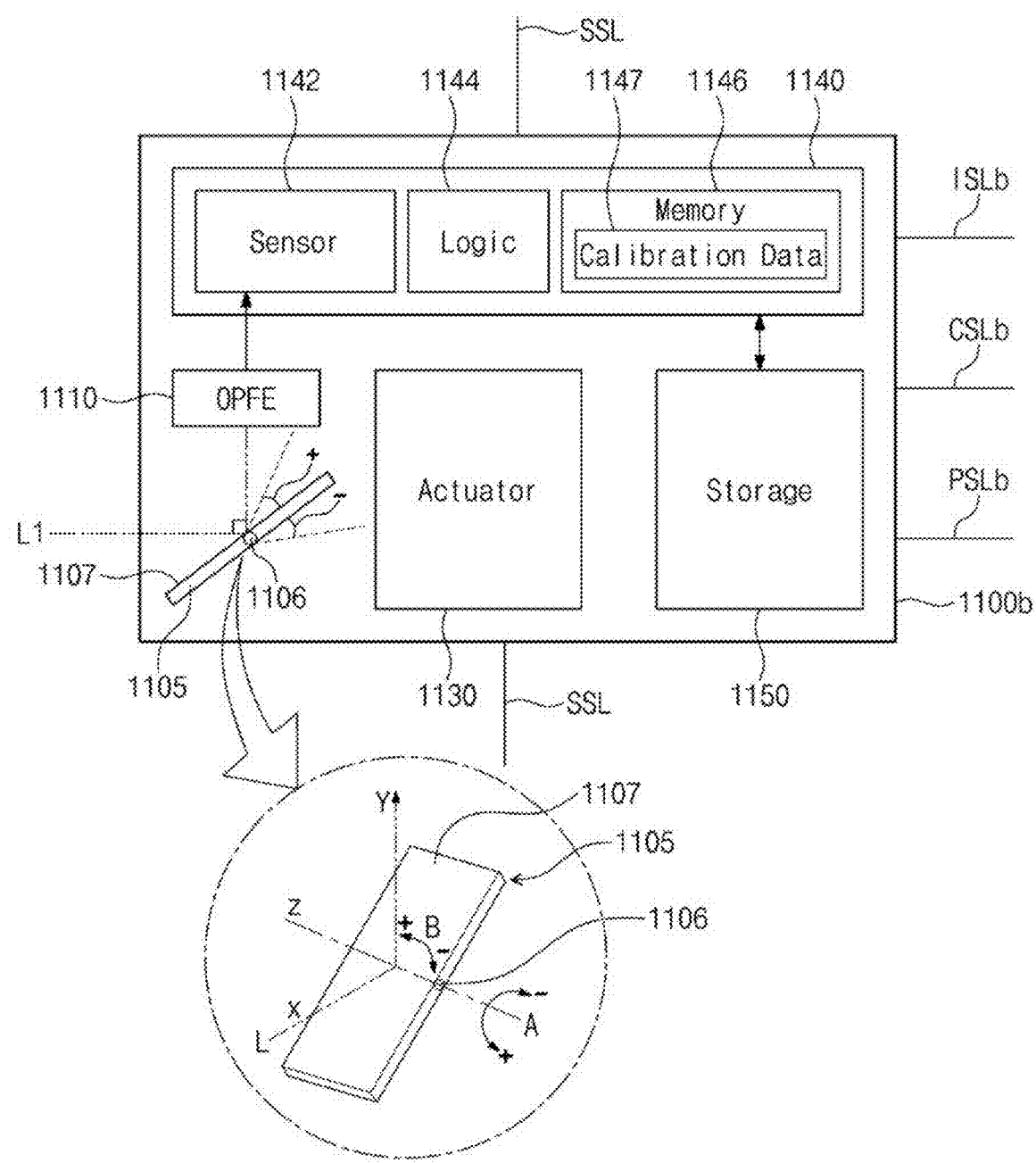
FIG. 14 illustrates an example of a configuration of a camera module of FIG. 13, according to an embodiment.

FIG. 13 is a block diagram of an electronic device including an image sensor according to the present disclosure. FIG. 14 is a configuration of a camera module of FIG. 13.

Referring to FIG. 13, an electronic device 1000 may include a camera module group 1100, an application processor 1200, a PMIC 1300, and an external memory 1400.

The camera module group 1100 may include a plurality of camera modules, for example camera module 1100a, camera module 1100b, and camera module 1100c. An electronic device including three camera modules 1100a, 1100b, and 1100c is illustrated in FIG. 13, but embodiments are not limited thereto. In some embodiments, the camera module group 1100 may be modified to include only two camera modules. Also, in some embodiments, the camera module group 1100 may be modified to include n camera modules (where n is a natural number greater than or equal to 4).

Below, examples of a detailed configuration of the camera module 1100b are more fully described with reference to FIG. 14, but the following description may be equally applied to the remaining camera modules 1100a and 1100c.

Referring to FIG. 14, the camera module 1100b may include a prism 1105, an optical path folding element (OPFE) 1110, an actuator 1130, an image sensing device 1140, and storage 1150.

The prism 1105 may include a reflecting plane 1107 of a light reflecting material and may change a path of light L which is incident from the outside.

In some embodiments, the prism 1105 may change a path of the light L incident in a first direction (e.g., the X-axis direction) to a second direction (e.g., the Y-axis direction) perpendicular to the first direction. Also, the prism 1105 may change the path of the light L incident in the first direction to the second direction by rotating the reflecting plane 1107 of the light reflecting material in a direction A about a central axis 1106 or rotating the central axis 1106 in direction B. In this case, the OPFE 1110 may move in a third direction (e.g., a Z-axis direction) perpendicular to the first direction and the second direction.

In some embodiments, as illustrated in FIG. 14, a maximum rotation angle of the prism 1105 in direction A may be equal to or smaller than 15 degrees in a positive A direction and may be greater than 15 degrees in a negative A direction, but embodiments are not limited thereto.

In some embodiments, the prism 1105 may move within approximately 20 degrees in a positive or negative B direction, between 10 degrees and 20 degrees, or between 15 degrees and 20 degrees; here, the prism 1105 may move at the same angle in the positive or negative B direction or may move at a similar angle within approximately 1 degree.

In some embodiments, the prism 1105 may move the reflecting plane 1107 of the light reflecting material in the third direction (e.g., the Z-axis direction) parallel to a direction in which the central axis 1106 extends.

The OPFE 1110 may include optical lenses including m groups (where m is a natural number), for example. Here, m lens may move in the second direction to change an optical zoom ratio of the camera module 1100b. For example, when a default optical zoom ratio of the camera module 1100b is denoted as R the optical zoom ratio of the camera module 1100b may be changed to an optical zoom ratio of 3R, 5R, or 5R or more by moving m optical lens included in the OPFE 1110.

The actuator 1130 may move the OPFE 1110 or an optical lens (hereinafter referred to as an optical lens) to a specific location. For example, the actuator 1130 may adjust a location of an optical lens such that an image sensor 1142 is placed at a focal length of the optical lens for accurate sensing.

The image sensing device 1140 may include the image sensor 1142, control logic 1144, and a memory 1146. The image sensor 1142 may sense an image of a sensing target by using the light L provided through an optical lens. The control logic 1144 may control overall operations of the camera module 1100b. For example, the control logic 1144 may control an operation of the camera module 1100b based on a control signal provided through a control signal line CSLb.

The memory 1146 may store information, which is necessary for an operation of the camera module 1100b, such as calibration data 1147. The calibration data 1147 may include information necessary for the camera module 1100b to generate image data by using the light L provided from the outside. The calibration data 1147 may include, for example, information about the degree of rotation described above, information about a focal length, information about an optical axis, etc. Based on the camera module 1100b including a multi-state camera in which a focal length varies depending on a location of an optical lens, the calibration data 1147 may include a focal length value for each location (or state) of the optical lens and information about auto focusing.

The storage 1150 may store image data sensed through the image sensor 1142. The storage 1150 may be disposed outside the image sensing device 1140, and may be stacked with a sensor chip included in the image sensing device 1140. In some embodiments, the storage 1150 may include an electrically erasable programmable read only memory (EEPROM), but embodiments are not limited thereto.

Referring together to FIGS. 13 and 14, in some embodiments, each of the camera modules 1100a, 1100b, and 1100c may include the actuator 1130. As such, the same calibration data 1147 or different calibration data 1147 may be included in the camera modules 1100a, 1100b, and 1100c depending on operations of the actuators 1130 therein.

In some embodiments, one camera module (e.g., 1100b) among the camera modules 1100a, 1100b, and 1100c may be a folded lens shape of camera module in which the prism 1105 and the OPFE 1110 described above are included, and the remaining camera modules (e.g., 1100a and 1100c) may be a vertical shape of camera module in which the prism 1105 and the OPFE 1110 described above are not included; however, embodiments are not limited thereto.

In some embodiments, one camera module (e.g., 1100c) among the camera modules 1100a, 1100b, and 1100c may be, for example, a vertical shape of depth camera extracting depth information by using an infrared ray (IR). In this case, the application processor 1200 may merge image data provided from the depth camera and image data provided from any other camera module (e.g., camera module 1100a or camera module 1100b) and may generate a three-dimensional (3D) depth image.

In some embodiments, at least two camera modules (e.g., camera module 1100a and camera module 1100b) among the camera modules 1100a, 1100b, and 1100c may have different fields of view. In this case, the at least two camera modules (e.g., camera module 1100a and camera module 1100b) among the camera modules 1100a, 1100b, and 1100c may include different optical lens, but embodiments are not limited thereto.

Also, in some embodiments, fields of view of the camera modules 1100a, 1100b, and 1100c may be different. In this case, the camera modules 1100a, 1100b, and 1100c may include different optical lens, not limited thereto.

In some embodiments, the camera modules 1100a, 1100b, and 1100c may be disposed to be physically separated from each other. For example, the camera modules 1100a, 1100b, and 1100c may not use a sensing area of one image sensor 1142, but the camera modules 1100a, 1100b, and 1100c may include independent image sensors 1142 therein, respectively.

Returning to FIG. 13, the application processor 1200 may include an image processing device 1210, a memory controller 1220, and an internal memory 1230. The application processor 1200 may be separated from the camera modules 1100a, 1100b, and 1100c. For example, the application processor 1200 and the camera modules 1100a, 1100b, and 1100c may be implemented using separate semiconductor chips.

The image processing device 1210 may include a plurality of sub image processors, for example sub image processor 1212a, sub image processor 1212b, and sub image processor 1212c, an image generator 1214, and a camera module controller 1216.

The image processing device 1210 may include the sub image processors 1212a, 1212b, and 1212c, the number of which corresponds to the number of the camera modules 1100a, 1100b, and 1100c.

Image data respectively generated from the camera modules 1100a, 1100b, and 1100c may be respectively provided to the corresponding sub image processors 1212a, 1212b, and 1212c through separated image signal lines ISLa, ISLb, and ISLc. For example, the image data generated from the camera module 1100a may be provided to the sub image processor 1212a through the image signal line ISLa, the image data generated from the camera module 1100b may be provided to the sub image processor 1212b through the image signal line ISLb, and the image data generated from the camera module 1100c may be provided to the sub image processor 1212c through the image signal line ISLc. This image data transmission may be performed, for example, by using a camera serial interface (CSI) based on the MIPI (Mobile Industry Processor Interface), but embodiments are not limited thereto.

In some embodiments, one sub image processor may be disposed to correspond to a plurality of camera modules. For example, the sub image processor 1212a and the sub image processor 1212c may be integrally implemented, not separated from each other as illustrated in FIG. 16; in this case, one of the pieces of image data respectively provided from the camera module 1100a and the camera module 1100c may be selected through a selection element (e.g., a multiplexer), and the selected image data may be provided to the integrated sub image processor.

The image data respectively provided to the sub image processors 1212a, 1212b, and 1212c may be provided to the image generator 1214. The image generator 1214 may generate an output image by using the image data respectively provided from the sub image processors 1212a, 1212b, and 1212c, depending on image generating information or a mode signal.

In detail, the image generator 1214 may generate the output image by merging at least a portion of the image data respectively generated from the camera modules 1100a, 1100b, and 1100c having different fields of view, depending on the image generating information or the mode signal. Also, the image generator 1214 may generate the output image by selecting one of the image data respectively generated from the camera modules 1100a, 1100b, and 1100c having different fields of view, depending on the image generating information or the mode signal.

In some embodiments, the image generating information may include a zoom signal or a zoom factor. Also, in some embodiments, the mode signal may be, for example, a signal based on a mode selected from a user.

Based on the image generating information being the zoom signal (or zoom factor) and the camera modules 1100a, 1100b, and 1100c having different visual fields of view, the image generator 1214 may perform different operations depending on a kind of the zoom signal. For example, based on the zoom signal being a first signal, the image generator 1214 may merge the image data output from the camera module 1100a and the image data output from the camera module 1100c and may generate the output image by using the merged image signal and the image data output from the camera module 1100b that is not used in the merging operation. Based on the zoom signal being a second signal different from the first signal, without the image data merging operation, the image generator 1214 may select one of the image data respectively output from the camera modules 1100a, 1100b, and 1100c and may output the selected image data as the output image. However, embodiments are not limited thereto, and a way to process image data may be modified without limitation if necessary.

In some embodiments, the image generator 1214 may generate merged image data having an increased dynamic range by receiving a plurality of image data of different exposure times from at least one of the sub image processors 1212a, 1212b, and 1212c and performing high dynamic range (HDR) processing on the plurality of image data.

The camera module controller 1216 may provide control signals to the camera modules 1100a, 1100b, and 1100c, respectively. The control signals generated from the camera module controller 1216 may be respectively provided to the corresponding camera modules 1100a, 1100b, and 1100c through control signal lines CSLa, CSLb, and CSLc separated from each other.

One of the camera modules 1100a, 1100b, and 1100c may be designated as a master camera (e.g., 1100b) depending on the image generating information including a zoom signal or the mode signal, and the remaining camera modules (e.g., 1100a and 1100c) may be designated as a slave camera. The above designation information may be included in the control signals, and the control signals including the designation information may be respectively provided to the corresponding camera modules 1100a, 1100b, and 1100c through the control signal lines CSLa, CSLb, and CSLc separated from each other.

Camera modules operating as a master and a slave may be changed depending on the zoom factor or an operating mode signal. For example, based on the field of view of the camera module 1100a being wider than the field of view of the camera module 1100b and the zoom factor indicating a low zoom ratio, the camera module 1100b may operate as a master, and the camera module 1100a may operate as a slave. In contrast, based on the zoom factor indicating a high zoom ratio, the camera module 1100a may operate as a master, and the camera module 1100b may operate as a slave.

In some embodiments, the control signal provided from the camera module controller 1216 to each of the camera modules 1100a, 1100b, and 1100c may include a sync enable signal. For example, based on the camera module 1100b being used as a master camera and the camera modules 1100a and 1100c are used as a slave camera, the camera module controller 1216 may transmit the sync enable signal to the camera module 1100b. The camera module 1100b that is provided with sync enable signal may generate a sync signal based on the provided sync enable signal and may provide the generated sync signal to the camera modules 1100a and 1100c through a sync signal line SSL. The camera module 1100b and the camera modules 1100a and 1100c may be synchronized with the sync signal to transmit image data to the application processor 1200.

In some embodiments, the control signal provided from the camera module controller 1216 to each of the camera modules 1100a, 1100b, and 1100c may include mode information according to the mode signal. Based on the mode information, the camera modules 1100a, 1100b, and 1100c may operate in a first operating mode and a second operating mode with regard to a sensing speed.

In the first operating mode, the camera modules 1100a, 1100b, and 1100c may generate image signals at a first speed (e.g., may generate image signals of a first frame rate), may encode the image signals at a second speed (e.g., may encode the image signal of a second frame rate higher than the first frame rate), and transmit the encoded image signals to the application processor 1200. In this case, the second speed may be 30 times or less the first speed.

The application processor 1200 may store the received image signals, for example, the encoded image signals in the memory 1230 provided therein or the external memory 1400 placed outside the application processor 1200. Afterwards, the application processor 1200 may read and decode the encoded image signals from the memory 1230 or the external memory 1400 and may display image data generated based on the decoded image signals. For example, the corresponding one among sub image processors 1212a, 1212b, and 1212c of the image processing device 1210 may perform decoding and may also perform image processing on the decoded image signal.

In the second operating mode, the camera modules 1100a, 1100b, and 1100c may generate image signals at a third speed (e.g., may generate image signals of a third frame rate lower than the first frame rate) and transmit the image signals to the application processor 1200. The image signals provided to the application processor 1200 may be signals that are not encoded. The application processor 1200 may perform image processing on the received image signals or may store the image signals in the memory 1230 or the external memory 1400.

The PMIC 1300 may supply powers, for example, power supply voltages to the camera modules 1100a, 1100b, and 1100c, respectively. For example, under control of the application processor 1200, the PMIC 1300 may supply a first power to the camera module 1100a through a power signal line PSLa, may supply a second power to the camera module 1100b through a power signal line PSLb, and may supply a third power to the camera module 1100c through a power signal line PSLc.

In response to a power control signal PCON from the application processor 1200, the PMIC 1300 may generate a power corresponding to each of the camera modules 1100a, 1100b, and 1100c and may adjust a level of the power. The power control signal PCON may include a power adjustment signal for each operating mode of the camera modules 1100a, 1100b, and 1100c. For example, the operating mode may include a low-power mode. In this case, the power control signal PCON may include information about a camera module operating in the low-power mode and a set power level. Levels of the powers respectively provided to the camera modules 1100a, 1100b, and 1100c may be identical to each other or may be different from each other. Also, a level of a power may be dynamically changed.

In the above embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

According to the present disclosure, because 16 pixels sharing a floating diffusion region may be connected to the same output line, the variation between pixels may decrease; also, as the transconductance increases, the noise of the output image may decrease.

According to the present disclosure, as two output lines are used to prevent the coupling between output lines in some operation modes, the influence between output lines may be minimized, and thus, the ghost phenomenon may be prevented.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A pixel array comprising:
a plurality of unit pixel groups; and
one or more columns,
wherein each column of the one or more columns comprises four column lines,
wherein each unit pixel group of the plurality of unit pixel groups comprises a first pixel group and a second pixel group, and wherein each of the first pixel group and the second pixel group comprises a plurality of pixels,
wherein the first pixel group and the second pixel group are arranged in a column direction,
wherein the each unit pixel group comprises a signal line including a drive transistor and a select transistor,
wherein two unit pixel groups from among the plurality of unit pixel groups share a floating diffusion region, and wherein signal lines of the two unit pixel groups are connected to one column line from among the four column lines,
wherein each of the two unit pixel groups is configured to transfer a pixel signal to the one column line through the signal lines in a readout operation,
wherein the floating diffusion region is located between a reset transistor and a dual conversion transistor included in the each unit pixel group of the plurality of unit pixel groups,
wherein the reset transistor is connected to a power supply voltage terminal, and
wherein the dual conversion transistor is connected to the reset transistor and the drive transistor.

2. The pixel array of claim 1, wherein two remaining unit pixel groups which do not share the floating diffusion region from among the plurality of unit pixel groups are respectively connected to two different column lines from among the four column lines, and
wherein the two remaining unit pixel groups are configured to be read out simultaneously.

3. The pixel array of claim 2, wherein two remaining column lines from among the four column lines are configured to be used as shielding lines for preventing coupling between the four column lines.

4. The pixel array of claim 3, wherein each of the two remaining unit pixel groups is configured to generate a pixel signal based on a pixel value of at least one pixel of the first pixel group during a first time period.

5. The pixel array of claim 3, wherein the first pixel group comprises four pixels corresponding to a same color, and
wherein each of the two remaining unit pixel groups is configured to generate a pixel signal by summing pixel values of the four pixels during a first time period.

6. The pixel array of claim 1, wherein four unit pixel groups which do not share the floating diffusion region from among the plurality of unit pixel groups are respectively connected to the four column lines, and
wherein the four unit pixel groups are configured to be read out simultaneously.

7. The pixel array of claim 6, wherein the first pixel group comprises four pixels corresponding to a same color, and
wherein each of the four unit pixel groups is configured to generate a pixel signal by summing pixel values of the four pixels during a first time period.

8. The pixel array of claim 7, wherein the four unit pixel groups comprise a first unit pixel group and a second unit pixel group,
wherein the first unit pixel group is located at a first row and is connected to a first column line of a first column,
wherein the second unit pixel group is located at a second row and is connected to a second column line of the first column, and
wherein the pixel array is configured to perform analog binning to output an average of pixel signals of the first unit pixel group, the second unit pixel group, a third unit pixel group located at the first row and connected to a first column line of a second column, and a fourth unit pixel group located at the second row and connected to a second column line of the second column.

9. The pixel array of claim 1, wherein a unit pixel group located at a first row and a second row from among the plurality of unit pixel groups is a dummy unit pixel group, and
wherein the dummy unit pixel group is not used to generate the pixel signal.

10. The pixel array of claim 1, wherein each unit pixel group of the plurality of unit pixel groups comprises two rows,
wherein a unit pixel group located at a first row and a second row and a unit pixel group located at a third row and a fourth row share the floating diffusion region and are connected to a first column line, wherein a unit pixel group located at a fifth row and a sixth row and a unit pixel group located at a seventh row and an eighth row share the floating diffusion region and are connected to a second column line, wherein a unit pixel group located at a ninth row and a tenth row and a unit pixel group located at an eleventh row and a twelfth row share the floating diffusion region and are connected to a third column line, wherein a unit pixel group located at a thirteenth row and a fourteenth row and a unit pixel group located at a fifteenth row and a sixteenth row share the floating diffusion region and are connected to a fourth column line.

11. A pixel array comprising:
a plurality of unit pixel groups; and
one or more columns,
wherein each column of the one or more columns comprises four column lines,
wherein each unit pixel group of the plurality of unit pixel groups comprises:
a first pixel group located at a first row and comprising a plurality of first color pixels;
a second pixel group located at a second row and comprising a plurality of second color pixels;
a first floating diffusion region connected to transfer transistors of the first pixel group and the second pixel group;
a drive transistor configured to generate a pixel signal;
a select transistor connected to one of the four column lines;
a reset transistor connected to a power supply voltage terminal;
a dual conversion transistor connected to the reset transistor and the drive transistor; and
a second floating diffusion region connected to the dual conversion transistor and the reset transistor,
wherein the drive transistor and the select transistor are included in a signal line,
wherein two neighboring unit pixel groups among the plurality of unit pixel groups share the second floating diffusion region and are connected to one column line from among the four column lines, and
wherein each of the two neighboring unit pixel groups is configured to transfer the pixel signal to the one column line through signal lines of the two neighboring unit pixel groups.

12. The pixel array of claim 11, wherein two unit pixel groups which do not shsre the second floating diffusion region from among the plurality of unit pixel groups are respectively connected to two different column lines from among the four column lines, and
wherein the two unit pixel groups are configured to be read out simultaneously.

13. The pixel array of claim 12, wherein two remaining column lines other than the two different column lines from among the four column lines are configured to be used as shielding lines for preventing coupling between the four column lines.

14. The pixel array of claim 13, wherein each of the two unit pixel groups is configured to generate the pixel signal based on a pixel value of at least one pixel of the first pixel group during a first time period.

15. The pixel array of claim 13, wherein the first pixel group comprises four pixels, and wherein each of the two unit pixel groups is configured to generate the pixel signal by summing pixel values of the four pixels of the first pixel group during a first time period.

16. The pixel array of claim 11, wherein four unit pixel groups which do not share the second floating diffusion region from among the plurality of unit pixel groups are respectively connected to the four column lines, and
wherein the four unit pixel groups are configured to be read out simultaneously.

17. The pixel array of claim 16, wherein the first pixel group comprises four pixels, and
wherein each of the four unit pixel groups is configured to generate the pixel signal by summing pixel values of the four pixels of the first pixel group during a first time period.

18. The pixel array of claim 17, wherein the four unit pixel groups comprise a first unit pixel group and a second unit pixel group,
wherein the first unit pixel group is connected to a first column line of a first column, and the second unit pixel group is connected to a second column line of the first column, and
wherein the pixel array is configured to perform analog binning to output an average of pixel signals of the first unit pixel group, the second unit pixel group, a third unit pixel group located at a same row as the first unit pixel group and connected to a first column line of a second column, and a fourth unit pixel group located at a same row as the second unit pixel group and connected to a second column line of the second column.

19. An image sensor comprising:
a pixel array comprising one or more columns and configured to output a plurality of pixel signals from a plurality of unit pixel groups, wherein each column of the one or more columns comprises four column lines;
a row driver configured to control each row of the pixel array;
a multiplexer configured to perform analog binning with respect to the plurality of pixel signals; and
an analog-to-digital conversion (ADC) circuit configured to convert a signal output from the multiplexer into a digital signal,
wherein each unit pixel group of the plurality of unit pixel groups comprises a first pixel group and a second pixel group, and wherein each of the first pixel group and the second pixel group comprises a plurality of pixels,
wherein the first pixel group and the second pixel group are arranged in a column direction,
wherein the each unit pixel group comprises a signal line comprising a drive transistor and a select transistor,
wherein signal lines of two unit pixel groups which share a floating diffusion region from among the plurality of unit pixel groups are connected to one column line from among the four column lines,
wherein the two unit pixel groups are configured to transfer a pixel signal to the one column line through the signal lines in a readout operation,
wherein the floating diffusion region is located between a reset transistor and a dual conversion transistor included in the each unit pixel group,
wherein the reset transistor is connected to a power supply voltage terminal, and
wherein the dual conversion transistor is connected to the reset transistor and the drive transistor.

20. The image sensor of claim 19, wherein two remaining unit pixel groups which do not share the floating diffusion region from among the plurality of unit pixel groups are respectively connected to two different column lines from among the four column lines, and
wherein the two remaining unit pixel groups are configured to be read out simultaneously.

* * * * *